(12) United States Patent
Tanigawa et al.

(10) Patent No.: US 8,726,118 B2
(45) Date of Patent: May 13, 2014

(54) COMMUNICATION SYSTEM, COMMUNICATION DEVICE, AND DATA FRAME RETRANSMISSION CONTROL METHOD

(71) Applicant: Kyocera Corporation, Kyoto (JP)

(72) Inventors: Hironobu Tanigawa, Tokyo (JP); Yasuhiro Nakamura, Kanagawa (JP); Nobuaki Takamatsu, Kanagawa (JP); Toru Sahara, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/670,360

(22) Filed: Nov. 6, 2012

(65) Prior Publication Data

US 2013/0132786 A1 May 23, 2013

Related U.S. Application Data

(63) Continuation of application No. 12/441,510, filed as application No. PCT/JP2007/067812 on Sep. 13, 2007.

(30) Foreign Application Priority Data

Sep. 15, 2006 (JP) ................. 2006-251772
Sep. 15, 2006 (JP) ................. 2006-251773
Sep. 15, 2006 (JP) ................. 2006-251774

(51) Int. Cl.
  *G08C 25/02* (2006.01)
(52) U.S. Cl.
  USPC ......................................... 714/748
(58) Field of Classification Search
  USPC ......................................... 714/748
  See application file for complete search history.

(56) References Cited

U.S. PATENT DOCUMENTS

| | | | |
|---|---|---|---|
| 6,330,699 B1 | 12/2001 | Yoshioka et al. | |
| 6,424,656 B1 | 7/2002 | Hoebeke | |
| 7,339,949 B2 | 3/2008 | Suzuki et al. | |
| 2002/0015408 A1* | 2/2002 | Rosier et al. | 370/392 |
| 2002/0154610 A1* | 10/2002 | Tiedemann et al. | 370/329 |

(Continued)

FOREIGN PATENT DOCUMENTS

| | | |
|---|---|---|
| JP | 06-177863 | 6/1994 |
| JP | 10-117182 | 5/1998 |

(Continued)

OTHER PUBLICATIONS

"Essence of wireless broadband-beyond the idea of comunication." Nikkei Communications, vol. 458, Nikkei Business Publications, Inc. (2006).

(Continued)

*Primary Examiner* — Philip Guyton
(74) *Attorney, Agent, or Firm* — Duane Morris LLP

(57) ABSTRACT

A mobile station device configured to communicate with a base station device by a time division duplex (TDD) scheme, and to transmit retransmission data to the base station device by an automatic retransmission scheme in response to reception acknowledgement information transmitted from the base station device, the mobile station device including a controller configured to determine a number of frames from a reception of the reception acknowledgement information to a transmission of the retransmission data, based on a position of a reception slot within a reception frame, the reception slot including the reception acknowledgement information.

2 Claims, 22 Drawing Sheets

| POSITION OF ASCH | | | |
|---|---|---|---|
| FIRST SLOT | SECOND SLOT | THIRD SLOT | FOURTH SLOT |
| TIMING 1 | TIMING 1 | TIMING 2 | TIMING 2 |

TIMING 1: TRANSMIT IN NEXT FRAME
TIMING 2: TRANSMIT IN FRAME FOLLOWING NEXT FRAME

(56) References Cited

U.S. PATENT DOCUMENTS

| | | | | |
|---|---|---|---|---|
| 2002/0172208 A1* | 11/2002 | Malkamaki | ............... | 370/400 |
| 2004/0042492 A1* | 3/2004 | Suzuki et al. | ............... | 370/473 |
| 2005/0221827 A1 | 10/2005 | Natsume | | |
| 2005/0276249 A1* | 12/2005 | Damnjanovic et al. | ....... | 370/335 |
| 2006/0107166 A1* | 5/2006 | Nanda | ............... | 714/748 |
| 2007/0168827 A1* | 7/2007 | Lohr et al. | ............... | 714/749 |
| 2009/0046604 A1 | 2/2009 | Matsumoto et al. | | |

FOREIGN PATENT DOCUMENTS

| | | |
|---|---|---|
| JP | 10-285180 | 10/1998 |
| JP | 11-098127 | 4/1999 |
| JP | 2000-069547 | 3/2000 |
| JP | 2000-151675 | 5/2000 |
| JP | 2002-152311 | 5/2002 |
| JP | 2004-253828 | 9/2004 |
| JP | 2004-527979 | 9/2004 |
| JP | 2005-286807 | 10/2005 |
| WO | WO-2006-075586 | 7/2006 |

OTHER PUBLICATIONS

Notice of Rejection (with partial English translation) for JP Application No. 2010-014908, dated Dec. 21, 2010.
Notice of Rejection (with partial English translation) for JP 2006-251772, Dated Oct. 27, 2009.
PCT/JP2007/067812 International Search Report mailed Dec. 11, 2007, 3 pages.

\* cited by examiner

FIG.11

| POSITION OF ASCH | | | |
|---|---|---|---|
| FIRST SLOT | SECOND SLOT | THIRD SLOT | FOURTH SLOT |
| TIMING 1 | TIMING 1 | TIMING 2 | TIMING 2 |

TIMING 1: TRANSMIT IN NEXT FRAME
TIMING 2: TRANSMIT IN FRAME FOLLOWING NEXT FRAME

FIG. 13
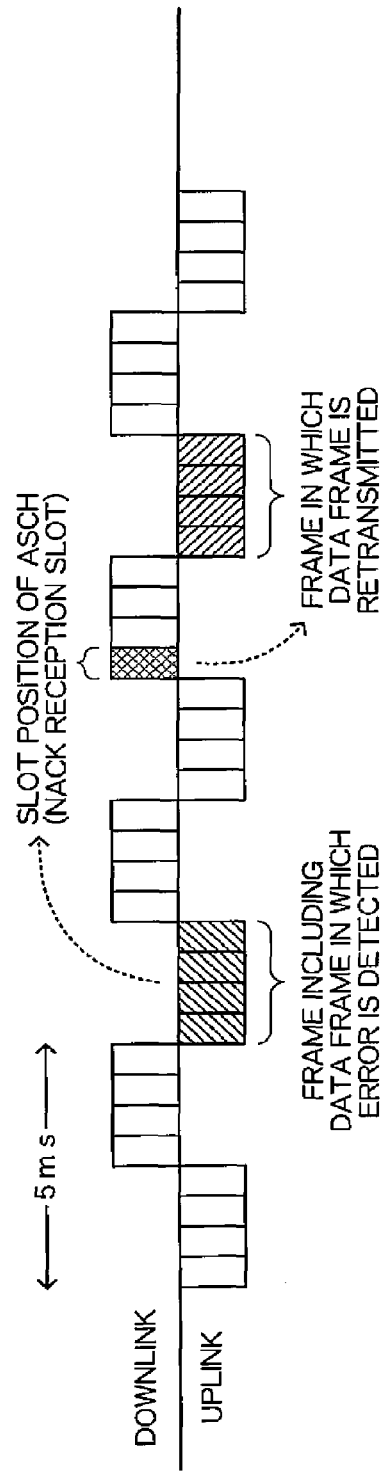
(a) CASE WHERE SLOT POSITION OF ASCH IS FIRST SLOT
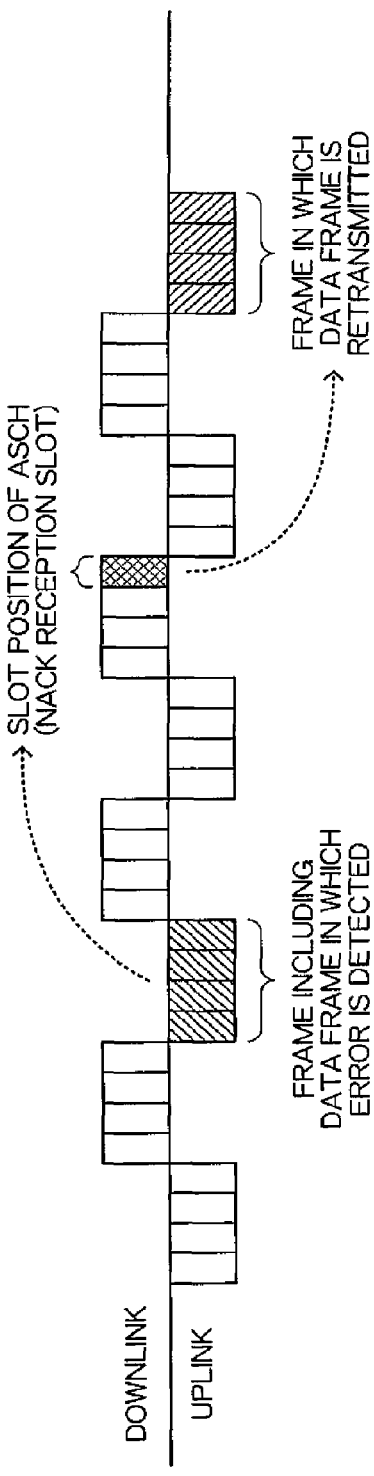
(b) CASE WHERE SLOT POSITION OF ASCH IS FOURTH SLOT

FIG. 18

| PROCESSING CAPABILITY OF MOBILE STATION DEVICE | POSITION OF ASCH | | | |
|---|---|---|---|---|
| | FIRST SLOT | SECOND SLOT | THIRD SLOT | FOURTH SLOT |
| LEVEL 0 | TIMING 1 | TIMING 1 | TIMING 1 | TIMING 1 |
| LEVEL 1 | TIMING 1 | TIMING 1 | TIMING 1 | TIMING 2 |
| LEVEL 2 | TIMING 1 | TIMING 1 | TIMING 2 | TIMING 2 |
| LEVEL 3 | TIMING 1 | TIMING 2 | TIMING 2 | TIMING 2 |
| LEVEL 4 | TIMING 2 | TIMING 2 | TIMING 2 | TIMING 2 |

TIMING 1: TRANSMIT IN NEXT FRAME
TIMING 2: TRANSMIT IN FRAME FOLLOWING NEXT FRAME

FIG.20
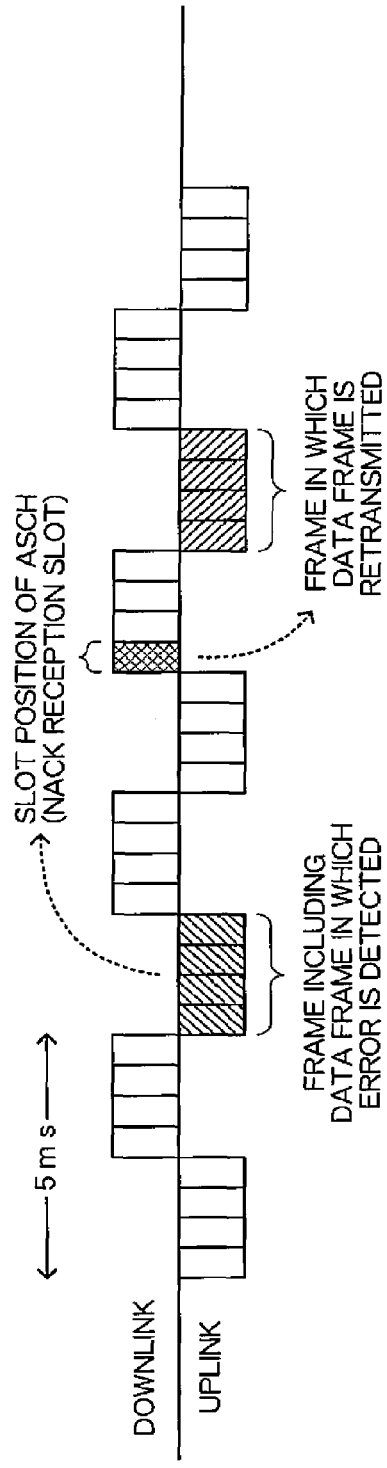
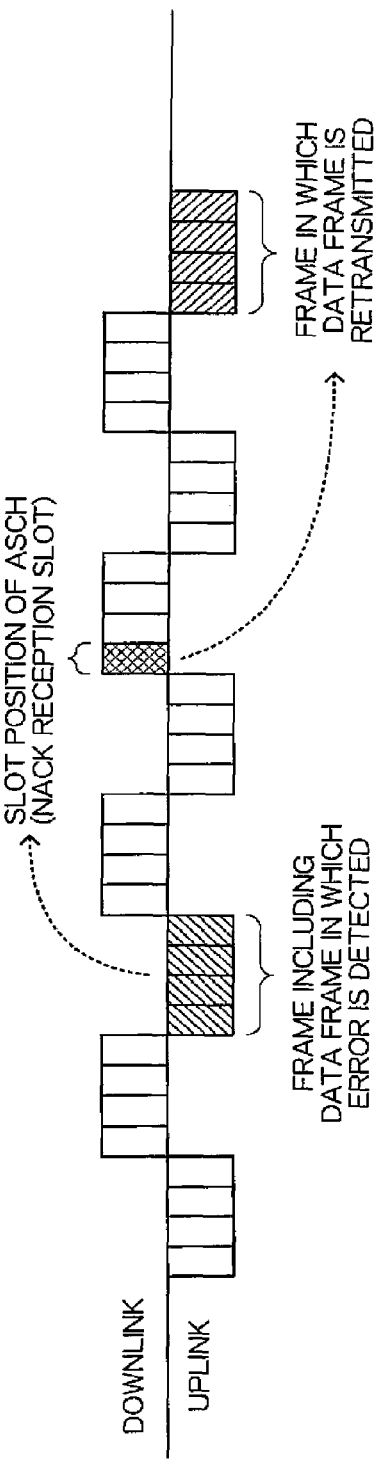

COMMUNICATION SYSTEM, COMMUNICATION DEVICE, AND DATA FRAME RETRANSMISSION CONTROL METHOD

CROSS-REFERENCE TO RELATED APPLICATIONS

This application is a Continuation of application Ser. No. 12/441,510 filed Jun. 5, 2009, which is a U.S. National Phase application of PCT Application No. PCT/JP2007/067812 filed Sep. 13, 2007, the contents of which are incorporated by reference herein in their entireties.

TECHNICAL FIELD

The present invention relates to a communication system, a communication device, and a data frame retransmission control method.

BACKGROUND ART

In an ARQ (Automatic Repeat Request) method which is one of error correction methods, when there is an error in a received data frame, the receiving side transmits a retransmission request of the data frame to the transmitting side. The transmitting side identifies the data frame to be retransmitted based on the received retransmission request, and retransmits the data frame to the receiving side. The retransmission request includes a sequence number (order number) for identifying the data frame to be retransmitted, and the transmitting side identifies the requested data frame based on the sequence number and retransmits the requested data frame (for example, refer to Patent Document 1).

For improving the error correction efficiency in the ARQ method, it is effective to reduce the number of retransmissions of the data frame, reduce the time period from reception of the retransmission request to retransmission of the data frame, etc. In this regard, Patent Document 2 discloses a wireless transmitting device to which a hybrid ARQ is applied wherein the number of retransmissions of the data frame is reduced so that the system throughput is improved.

[Patent Document 1] JP 10-117182 A
[Patent Document 2] JP 2004-253828 A

SUMMARY OF THE INVENTION

However, in the ARQ method of the related art as described above, the data size of the retransmission request is enlarged corresponding to the number of bits of the sequence number. In particular, when communication data and other data are transmitted along with the retransmission request, it is desired that the number of bits assigned to the retransmission request be reduced so that more number of bits can be assigned to the communication data or the like.

In addition, because a certain processing time (hereinafter referred to as "reference required time") is required from the reception of the retransmission request to the retransmission of the data frame, it may become difficult to retransmit the data frame using the transmission frame immediately following the frame in which the retransmission request is received, particularly in a communication according to a TDMA/TDD (Time Division Multiple Access/Time Division Duplex) system. Because of this, in the ARQ of the related art applied to the TDMA/TDD system, in order to secure a sufficient time for the retransmission process of the data frame, the data frame is uniformly retransmitted using the transmission frame of two or more frames later than the frame in which the retransmission request is received. As a result, there is a problem in that a retransmission delay of greater than or equal to 1 TDMA frame always occurs when there is an error in the data frame.

The present invention was conceived in view of the above-described problem of the related art, and a first object is to provide a communication system, a receiving device, a transmitting device, and a data frame retransmission control method which can achieve an automatic retransmission control of the data frame without including the sequence number of the data frame in the retransmission request.

A second object is to provide a communication device and a data frame retransmission method which can preferably shorten the time from the reception of the retransmission request to the retransmission of the data frame.

In order to achieve the first object, a communication system according to the present invention is a communication system having a transmitting device and a receiving device which employ an automatic repeat request method of a data frame, wherein the receiving device includes retransmission request transmission timing identifying means for identifying, based on a timing of reception of a data frame transmitted from the transmitting device, a timing of transmission of a retransmission request of the data frame to the transmitting device, the transmitting device includes retransmission data frame selecting means for selecting, based on a timing of reception of the retransmission request transmitted from the receiving device, a data frame to be retransmitted from among a plurality of data frames transmitted to the receiving device, and retransmits the data frame selected by the retransmission data frame selecting means to the receiving device.

According to the present invention, the receiving device identifies, based on a reception timing of a data frame (transmission timing for the transmitting device), a response timing (reception timing for the transmitting device) of the retransmission request for the data frame. On the other hand, the transmitting device identifies, based on the reception timing of the retransmission request, the timing when the data frame corresponding to the retransmission request was transmitted. In other words, in this communication system, the receiving device and the transmitting device share the timing difference (time interval) between the transmission (reception) timing of the data frame and the reception (transmission) timing of the retransmission request for the data frame. Because of this configuration, even if the sequence number of the data frame is omitted in the retransmission request, the transmitting device can identify to which data frame the received retransmission request corresponds.

The transmitting device may further include transmitted data frame storage means for storing at least some of the plurality of data frames transmitted to the receiving device in a manner to allow identification of a timing of transmission of each of the data frames, and the retransmission data frame selecting means may identify a timing of transmission of the data frame to be retransmitted based on the timing of reception of the retransmission request and select the data frame to be retransmitted from the transmitted data frame storage means based on the identified timing.

The communication system may further employ a time division multiplex communication system, and the timing may be identified by a time slot or a time frame according to time division multiplexing.

A receiving device according to the present invention is a receiving device which receives a data frame transmitted from a transmitting device and which transmits, upon detection of an error in the received data frame, a retransmission request of the data frame to the transmitting device, the receiving device including retransmission request transmission timing identifying means for identifying, based on a timing of reception of the data frame, a timing of transmission of the retransmission request of the data frame.

A transmitting device according to the present invention is a transmitting device which transmits a data frame to a receiving device and which retransmits, in response to a retransmission request from the receiving device, a data frame corresponding to the retransmission request, the transmitting device including retransmission data frame selecting means for selecting, based on a timing of reception of the retransmission request, a data frame to be retransmitted from among a plurality of data frames transmitted to the receiving device, and retransmits a data frame selected by the retransmission data frame selecting means to the receiving device.

A data frame retransmission control method according to the present invention is a data frame retransmission control method in a communication system having a transmitting device and a receiving device, the data frame retransmission control method including a retransmission request transmission timing identifying step of identifying, based on a timing at which the receiving device receives a data frame transmitted from the transmitting device, a timing of transmission of a retransmission request of the data frame to the transmitting device, and a retransmission data frame selecting step of selecting, based on a timing at which the transmitting device receives the retransmission request, a data frame to be retransmitted from among a plurality of data frames transmitted to the receiving device.

In order to achieve the second object, a communication device according to the present invention is a communication device which communicates with another communication device according to a time division duplex system and which retransmits, in response to a retransmission request transmitted from the other communication device, a data frame corresponding to the retransmission request to the other communication device, the communication device including data frame retransmission timing determining means for determining a retransmission timing of the data frame based on a reception timing of the retransmission request so that a timing difference between the reception timing of the retransmission request and the retransmission timing of the data frame corresponding to the retransmission request is close to a reference required time required from reception of a retransmission request to retransmission of a data frame.

According to the present invention, a retransmission timing of a data frame is determined based on a reception timing of the retransmission request so that the time from reception of the retransmission request to the retransmission of the data frame is close to a reference required time required for the retransmission process of the data frame. Because of this configuration, it is possible to preferably shorten the time from the reception of the retransmission request to the retransmission of the data frame.

The communication device may further include timing difference information storage means for storing, in correlation to information indicating a reception timing of a retransmission request, timing difference information indicating a timing difference which satisfies a condition related to the reference required time, wherein the data frame retransmission timing determining means may read timing difference information from the timing difference information storage means in correlation to the reception timing of the retransmission request and determine the retransmission timing of the data frame based on the reception timing of the retransmission request and the read timing difference information.

A communication device according to the present invention is a communication device which communicates with another communication device according to a time division duplex system and which retransmits, in response to a retransmission request transmitted from the other communication device, a data frame corresponding to the retransmission request to the other communication device, the communication device including data frame retransmission timing determining means for determining a retransmission timing of the data frame based on a processing capability of the communication device so that a timing difference between a reception timing of the retransmission request and the retransmission timing of the data frame corresponding to the retransmission request is close to a reference required time required from reception of a retransmission request to retransmission of a data frame.

According to the present invention, the retransmission timing of the data frame is determined in consideration of the processing capability of the communication device so that the time from reception of the retransmission request to the retransmission of the data frame is close to the reference required time required for retransmission process of the data frame. Because of this configuration, it is possible to preferably shorten the time from the reception of the retransmission request to the retransmission of the data frame.

The data frame retransmission timing determining means may determine the retransmission timing of the data frame further based on the reception timing of the retransmission request. With such a configuration, it is possible to determine the retransmission timing of the data frame further based on, in addition to the processing capability of the communication device, the reception timing of the retransmission request. Thus, it is possible to more preferably shorten the time from the reception of the retransmission request to the retransmission of the data frame.

The communication device may further include timing difference information storage means for storing, in correlation to information indicating a processing capability of a communication device and information indicating a reception timing of a retransmission request, timing difference information indicating a timing difference which satisfies a condition related to the reference required time, wherein the data frame retransmission timing determining means may read the timing difference information from the timing difference information storage means in correlation to the processing capability of the communication device and the reception timing of the retransmission request and determine the retransmission timing based on the reception timing of the retransmission request and the read timing difference information.

The reception timing may be identified by a reception slot, and the retransmission timing may be identified by a transmission slot or a transmission frame including the transmission slot.

A data frame retransmission method according to the present invention is a data frame retransmission method in which a data frame is retransmitted in response to a retransmission request in a communication according to a time division duplex system, the data frame retransmission method including a step of determining a retransmission timing of the data frame based on a reception timing of the retransmission request so that a timing difference between the reception timing of the retransmission request and the retransmission timing of the data frame corresponding to the retransmission request is close to a reference required time required from reception of a retransmission request to retransmission of a data frame.

A data frame retransmission method according to the present invention is a data frame retransmission method in which a data frame is retransmitted in response to a retransmission request in a communication according to a time division duplex system, the data frame retransmission method including a step of determining a retransmission timing of the data frame based on a processing capability of the communication device so that a timing difference between a reception timing of the retransmission request and the retransmission timing of the data frame corresponding to the retransmission request is close to a reference required time required from reception of a retransmission request to retransmission of a data frame.

BRIEF DESCRIPTION OF THE DRAWINGS

FIG. 11 is a diagram showing an example of a timing difference information storage unit.

FIG. 13 is a diagram for explaining a retransmission timing of a data frame.

FIG. 18 is a diagram showing an example of a timing difference information storage unit.

FIG. 20 is a diagram for explaining a retransmission timing of a data frame.

DESCRIPTION OF EXEMPLARY EMBODIMENTS OF THE INVENTION

Embodiments of the present invention will now be described in detail with reference to the drawings.

First Embodiment

Figure 1:
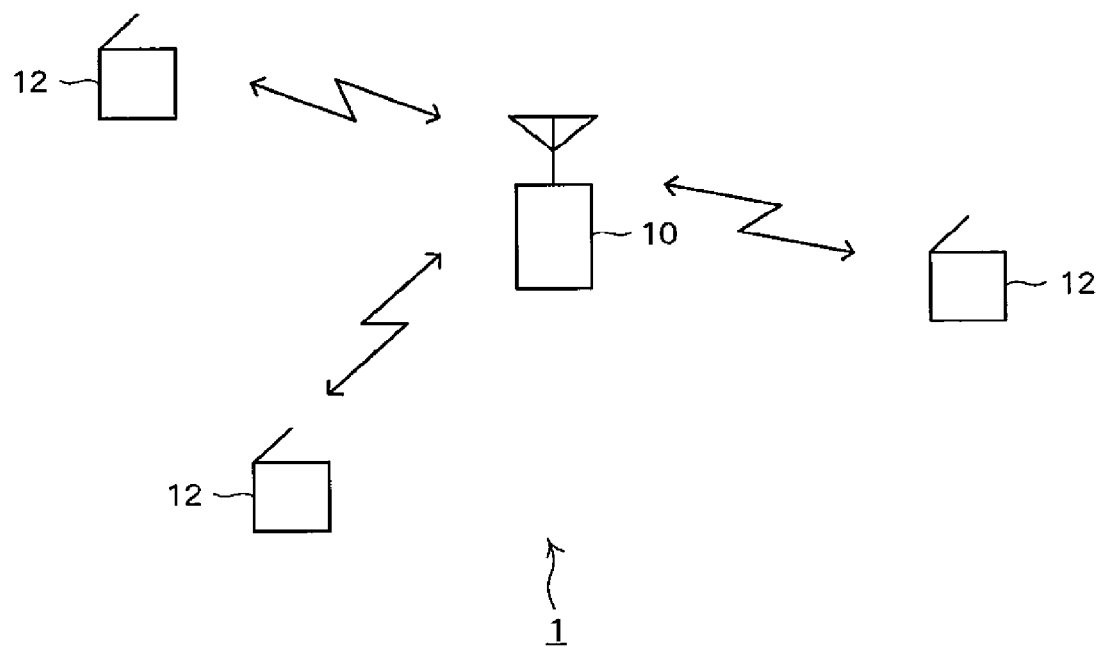
FIG. 1 is an overall configuration diagram of a mobile communication system according to a first embodiment of the present invention.

FIG. 1 is an overall configuration diagram of a mobile communication system according to a first embodiment of the present invention. As shown in FIG. 1, the mobile communication system 1 includes a base station device 10 and a plurality of mobile station devices 12 (here, three mobile station devices).

Each of the mobile station devices 12 wirelessly communicates with the base station device 10, and may be, for example, a portable cellular phone, a personal digital assistant, or a communication card. In this configuration, the mobile station device 12 transmits and receives data to and from the base station device 10 according to a TDD (Time Division Duplex) system and executes a multiplex communication according to a TDMA (Time Division Multiple Access) system and an OFDMA (Orthogonal Frequency Division Multiple Access) system. In addition, the base station device 10 includes an adaptive array antenna as will be described below, and executes a multiplex communication with each of the plurality of mobile station devices 12 at a same time slot and a same carrier frequency according to an SDMA (Space Division Multiple Access) system using the adaptive array antenna. In this manner, a bidirectional communication with the plurality of mobile station devices 12 is executed with a very high frequency usage efficiency.

Figure 4:
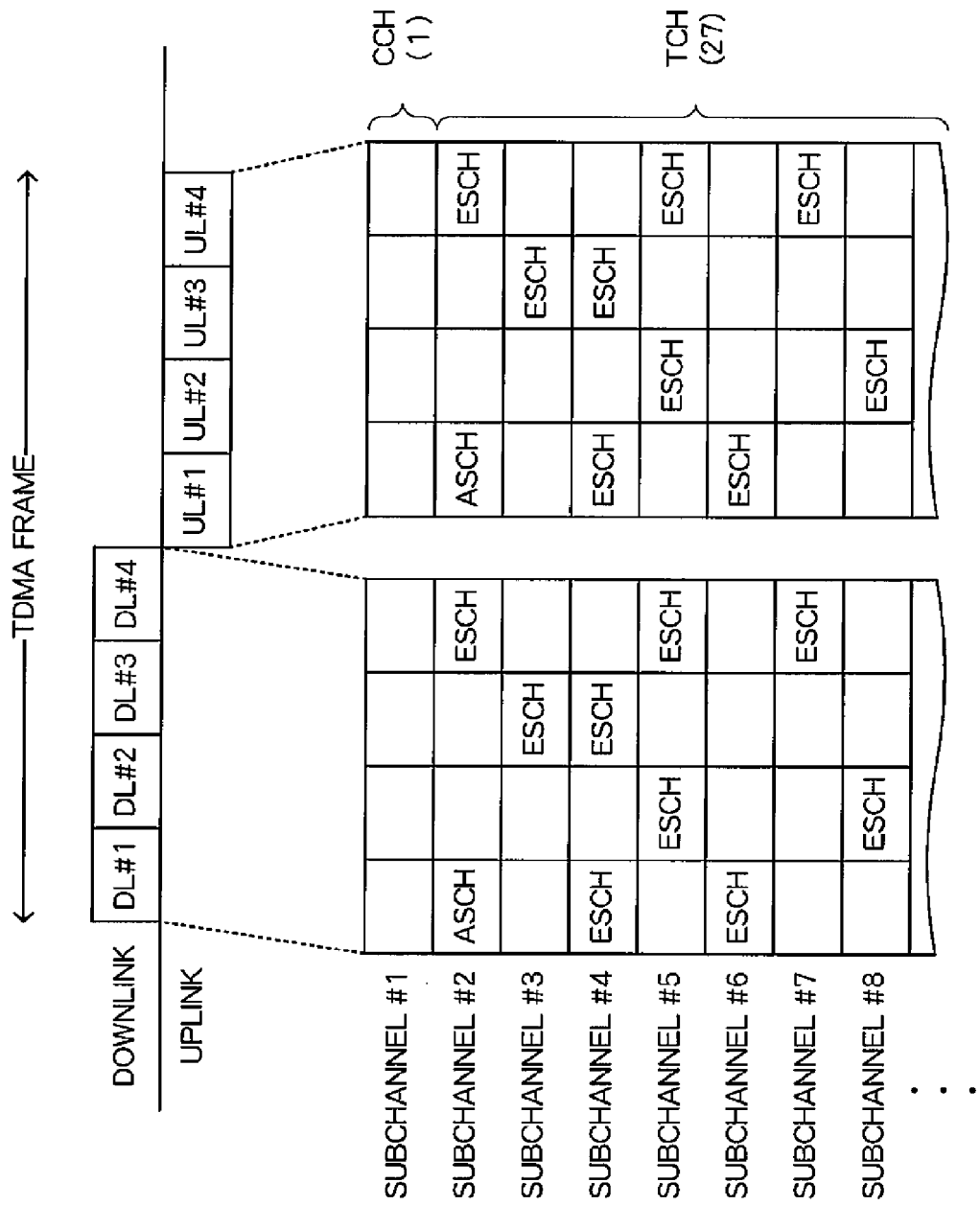
FIG. 4 is a diagram showing an example of a time slot structure according to TDMA/TDD and a subchannel structure according to OFDMA.

FIG. 4 is a diagram showing an example of a time slot structure (1 TDMA frame) according to TDMA/TDD and a subchannel structure according to OFDMA. As shown in FIG. 4, each of a downlink (wireless transmission path from the base station device 10 to the mobile station device 12) and an uplink (wireless transmission path from the mobile station device 12 to the base station device 10) includes 4 time slots. Each time slot includes 28 subchannels, one of which is used as a control channel (CCH) and the remaining 27 of which are used as traffic channels (TCH).

The base station device 10 assigns at least some of a total of 108 subchannels (27 subchannels×4 slots) used as the traffic channels to each of the mobile station devices 12 in each of the downlink and the uplink. More specifically, as shown in FIG. 4, the base station device 10 assigns one anchor subchannel (ASCH) and assigns one or a plurality of extra subchannels (ESCH) as necessary, for each mobile station device 12.

The ASCH is a subchannel which is determined when a link is established (at the start of communication) and notified to each of the mobile station devices 12 using the CCH, and is used for transmitting and receiving MAP information and other control information. The MAP information is a bit sequence having a length of 108 bits indicating one or a plurality of ESCH to be used in the next TDMA frame (next uplink frame and downlink frame) after the MAP information is received. More specifically, a bit corresponding to ESCH to be assigned to the mobile station device 12 in the next TDMA frame is indicated with "1" and bits corresponding to the other subchannels (ASCH, ESCH to be assigned to other mobile station devices 12, and idle subchannel) are indicated with "0". The ESCH, on the other hand, is a subchannel which is determined after the link is established and is identified by the MAP information notified to the mobile station device 12 using the ASCH, and is primarily used for transmission and reception of communication data. As shown in FIG. 4, the ASCH and ESCH are assigned to the same subchannel in the downlink slot and the uplink slot having corresponding slot numbers (DL#1 and UL#1, DL#2 and UL#2, ... ).

Figure 5:
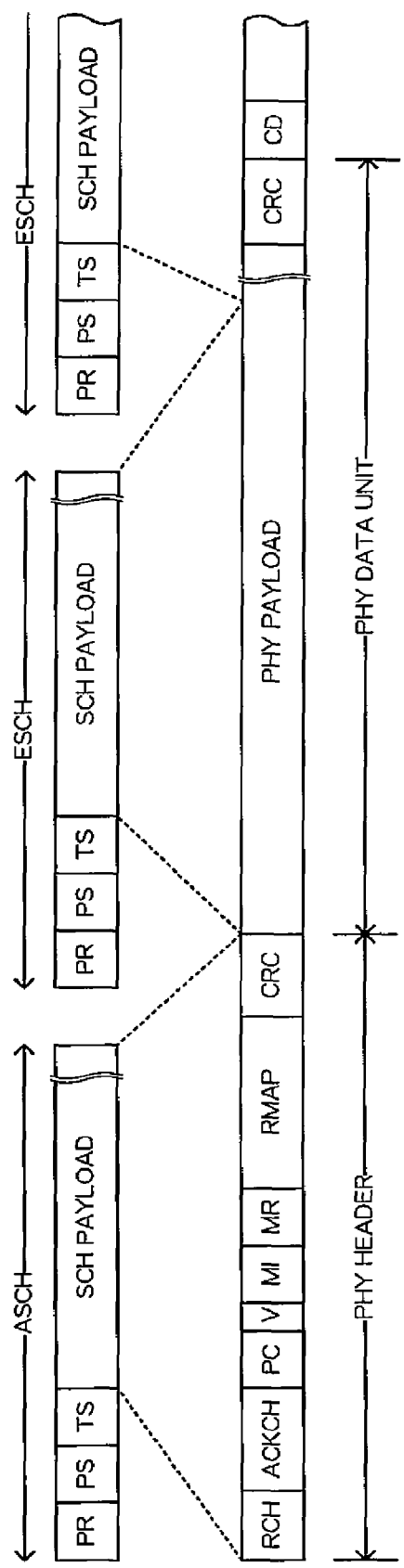
FIG. 5 is a diagram showing an example of a PHY frame structure in an uplink.

FIG. 5 is a diagram showing an example of a PHY (Physical Layer) frame structure in the uplink. Data of 1 PHY frame is transmitted in 1 TDMA frame. More specifically, the data of 1 PHY frame is distributed over SCH (Subchannel) payloads corresponding to one ASCH and one or a plurality of ESCH in each TDMA frame and is transmitted. As shown in FIG. 5, the PHY frame includes a PHY header including ACKCH, RMAP, etc., and a plurality of PHY data units including PHY payload, etc. In the present embodiment, a data frame to be retransmitted indicates the PHY frame, and the retransmission of the PHY frame is controlled using a hybrid ARQ method.

In this configuration, the ACKCH (Acknowledge Channel) is a region which stores ACK (Acknowledge) or NACK (Negative Acknowledge) indicating presence or absence of error in the data frame received in downlink. In particular, when the ACKCH stores NACK, the ACKCH represents a retransmission request of a data frame. A characteristic of the present embodiment is that ARQ is achieved without including the sequence number of the data frame in the retransmission request and that, as a result, the PHY header size can be reduced.

The RMAP (Refuse MAP) is a region which stores RMAP information having a same size as the MAP information. The RMAP information is a bit sequence having a length of 108 bits indicating the ESCH refusing the assignment from the base station device 10 in the next TDMA frame. More specifically, the RMAP information is a bit sequence having a length of 108 bits indicating the ESCH refusing the assignment from the base station device 10 in the next TDMA frame, and indicates a bit corresponding to the ESCH refusing the assignment with "1" and the other bits with "0".

Configurations and operations of the base station device 10 and the mobile station device 12 will now be described.

Figure 2:
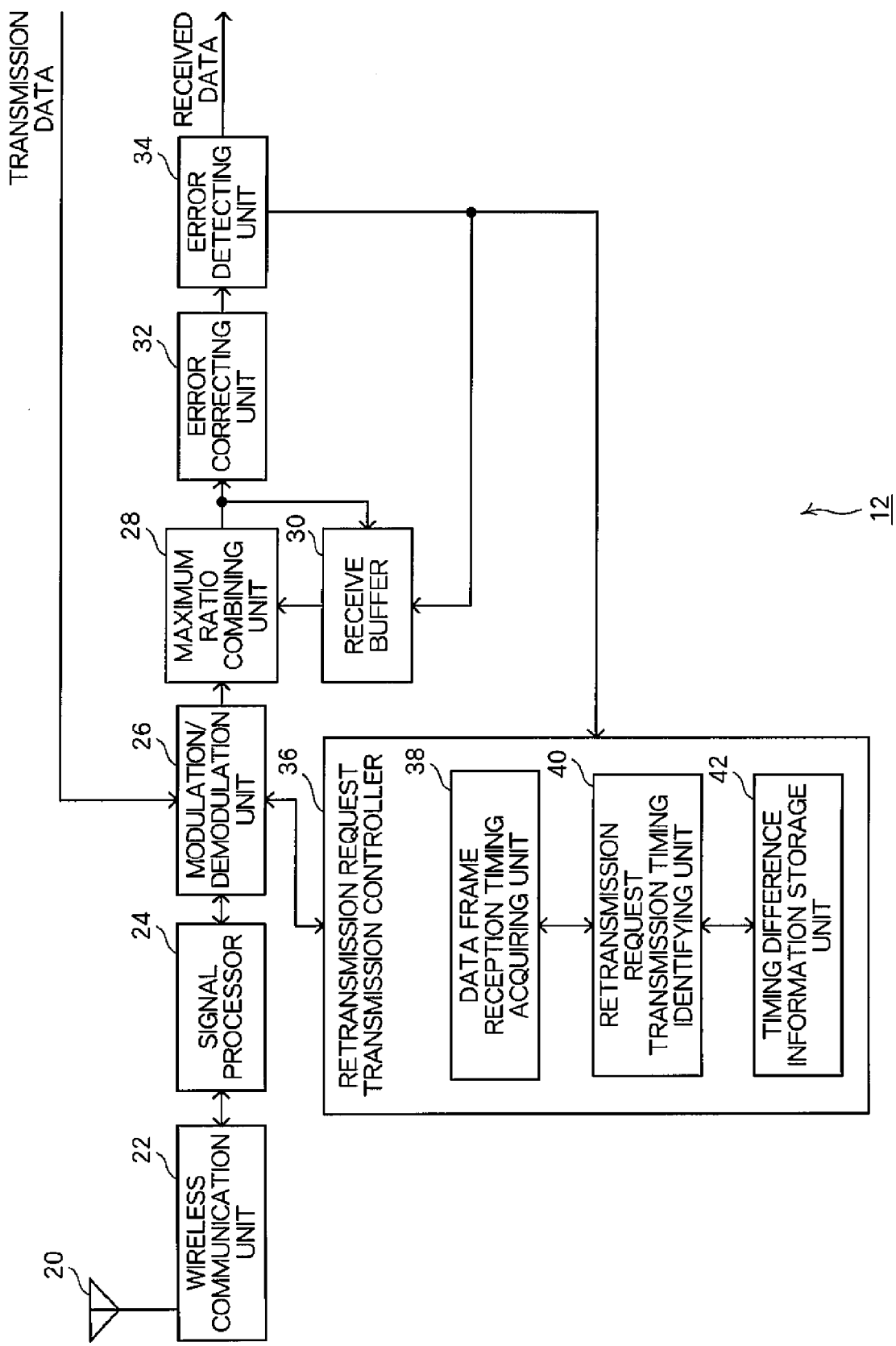
FIG. 2 is a functional block diagram of a mobile station device according to the first embodiment of the present invention.

FIG. 2 is a functional block diagram of the mobile station device 12. As shown in FIG. 2, the mobile station device 12 includes an antenna 20, a wireless communication unit 22, a signal processor 24, a modulation/demodulation unit 26, a maximum ratio combining unit 28, a receive buffer 30, an error correcting unit 32, an error detecting unit 34, and a retransmission request transmission controller 36.

The wireless communication unit 22 includes a low noise amplifier, a down-converter, and an up-converter. The wireless communication unit 22 down-converts a wireless signal from the base station device 10 received by the antenna 20 and outputs to the signal processor 24. The wireless communication unit 22 also up-converts a transmission signal which is input from the signal processor 24 into a wireless signal, amplifies the wireless signal to a transmission power level, and transmits from the antenna 20.

The signal processor 24 executes processes such as symbol synchronization and removal of a guard interval (GI) signal on the signal which is input from the wireless communication unit 22, to acquire a baseband OFDM signal, and outputs to the modulation/demodulation unit 26. The signal processor 24 also adds a guard interval signal to a baseband OFDM signal which is input from the modulation/demodulation unit 26 and outputs to the wireless communication unit 22.

The modulation/demodulation unit 26 includes an A/D converter, an FFT unit, and a channel estimation unit. The modulation/demodulation unit 26 OFDM-demodulates the baseband OFDM signal which is input from the signal processor 24 and outputs the acquired received data frame (data corresponding to 1 downlink frame) to the maximum ratio combining unit 28. More specifically, after the modulation/demodulation unit 26 A/D-converts the baseband OFDM signal, the modulation/demodulation unit 26 applies an FFT in the FFT unit, to acquire subcarrier components of the OFDM symbol. After the modulation/demodulation unit 26 applies a predetermined channel estimation process or the like, the modulation/demodulation unit 26 connects the subcarrier components corresponding to a plurality of subchannels (one ASCH and one or a plurality of ESCH) assigned by the base station device 10, to create a symbol sequence. The modulation/demodulation unit 26 then outputs the symbol sequence to the maximum ratio combining unit 28.

The modulation/demodulation unit 26 also includes a symbol mapping unit, an IFFT unit, and a D/A converter. The modulation/demodulation unit 26 OFDM-modulates a transmission data which is input from an external connection device or data input unit (not shown) and outputs the acquired baseband OFDM signal to the signal processor 24. More specifically, the modulation/demodulation unit 26 distributes the transmission data over a plurality of PHY payloads, and adds a PHY header including ACKCH which stores ACK or NACK which is input from the retransmission request transmission controller 36 to a PHY data unit acquired by combining the PHY payloads, to construct a predetermined PHY frame. Then, the modulation/demodulation unit 26 divides the data corresponding to the PHY frame to SCH payloads corresponding to a plurality of subchannels (one ASCH and one or a plurality of ESCH) assigned by the base station device 10, to create transmission data for each subchannel. During this process, the data sequence including the ACKCH is assigned to the SCH payload corresponding to the ASCH. Then, the modulation/demodulation unit 26 converts the created transmission data of each of the subchannels into a symbol sequence through a symbol mapping and distributes the symbol sequence over subcarriers of the subchannel. The modulation/demodulation unit 26 then applies an IFFT in the IFFT unit and outputs the baseband OFDM signal acquired through a D/A conversion to the signal processor 24.

The maximum ratio combining unit 28 maximum-ratio combines a symbol sequence created from the received data frame which is input from the modulation/demodulation unit 26 and a symbol sequence created from past received data frame which is input from the receive buffer 30, and is provided for improving an error correction percentage of the received data in the error correcting unit 32. The symbol sequence created from the past received data frame is read from the receive buffer 30 based on the sequence number of the received data frame which is input from the modulation/demodulation unit 26.

The receive buffer 30 stores a symbol sequence which is input from the maximum ratio combining unit 28 in correlation to the sequence number of the received data frame. The symbol sequence for which no error is detected by the error detecting unit 34 is deleted from the receive buffer 30 at a predetermined timing.

The error correcting unit 32 applies an extraction of a bit sequence and an error correction with a predetermined error correction algorithm, on the symbol sequence which is input from the maximum ratio combining unit 28. If an error is not corrected in the error correcting unit 32, the error is detected by the error detecting unit 34 which is at downstream of the error correcting unit 32.

The error detecting unit 34 detects whether or not there is a data error in the data after error correction which is input from the error correcting unit 32. The error detecting unit 34 outputs, as the received data, only the data for which no error is detected to the external connection device (not shown). The data for which an error is detected is set as a target of the retransmission request, and the data is not output to the external connection device until the correct data frame is retransmitted from the base station device 10. A detection result by the error detecting unit 34 is output to the retransmission request transmission controller 36. As the method of detecting error, for example, CRC (Cyclic Redundancy Check) is employed.

The retransmission request transmission controller 36 includes a data frame reception timing acquiring unit 38, a retransmission request transmission timing identifying unit 40, and a timing difference information storage unit 42, and creates ACK or NACK based on the error detection result which is input from the error detecting unit 34. The retransmission request transmission controller 36 applies a control to transmit the created ACK or NACK to the base station device 10 at a predetermined timing without adding the sequence number of the data frame. More specifically, the retransmission request transmission controller 36 creates ACK when no error is detected in the error detecting unit 34 and creates NACK when an error is detected. The retransmission request transmission controller 36 outputs the created ACK or NACK to the modulation/demodulation unit 26 so that the created ACK or NACK is transmitted at a timing identified by the retransmission request transmission timing identifying unit 40 to be described later.

The data frame reception timing acquiring unit 38 acquires a reception timing of each received data frame acquired by the modulation/demodulation unit 26. The reception timing may be identified by the downlink slot or the downlink frame when the data frame is received, and information on which of the downlink slot or the downlink frame is to be used as the reception timing is shared between each mobile station device 12 and the base station device 10 in advance.

The timing difference information storage unit 42 stores timing difference information indicating a timing difference (time interval) between the reception timing of the data frame and the transmission timing of the retransmission request for the data frame. The timing difference information may be time or may be the number of TDMA slots or the number of TDMA frames, and is same information as timing difference information stored in a timing difference information storage unit 66 of the base station device 10. In other words, the timing difference between the reception (transmission) timing of the data frame and the transmission (reception) timing of the retransmission request for the data frame is shared between each mobile station device 12 and the base station device 10 in advance. The timing difference information may be defined in the mobile communication system 1 in advance or may be determined between each mobile station device 12 and the base station device 10 at the start of the communication.

The retransmission request transmission timing identifying unit 40 identifies a timing of transmission of the retransmission request of the data frame based on the timing of reception of the data frame which is transmitted from the base station device 10. More specifically, the retransmission request transmission timing identifying unit 40 identifies the transmission timing of the ACK or the NACK for the data frame based on the reception timing of the data frame acquired by the data frame reception timing acquiring unit 38 and the timing difference information (information indicating a timing difference between reception timing of the data frame and the transmission timing of the retransmission request for the data frame) stored in the timing difference information storage unit 42. The transmission timing may be identified by the uplink slot or the uplink frame in which the ACK or the NACK is transmitted, and information on which of the uplink slot and the uplink frame is used as the transmission timing is shared between each mobile station device 12 and the base station device 10 in advance.

Figure 6:
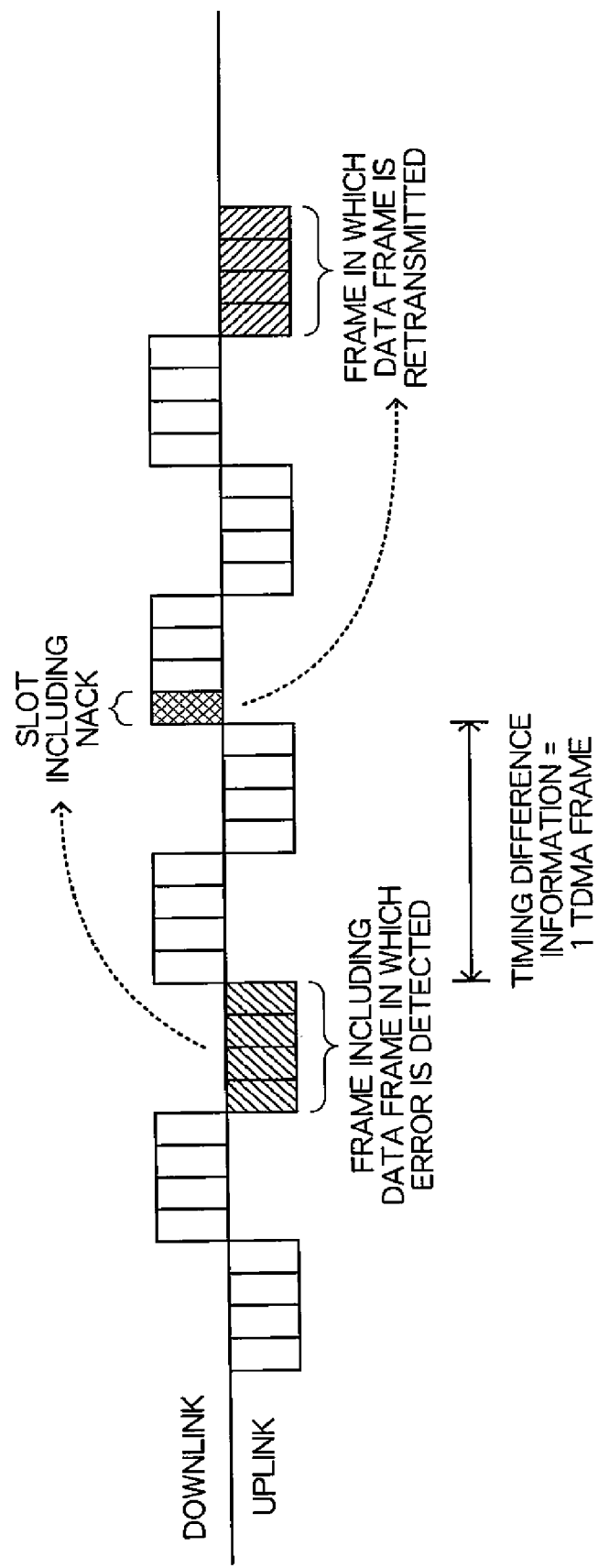
FIG. 6 is a diagram for explaining a transmission timing of a retransmission request.

FIG. 6 is a diagram for explaining a transmission timing of the retransmission request identified by the retransmission request transmission timing identifying unit 40. Here, a case will be described in which the timing difference information stored in the timing difference information storage unit 42 is "1 TDMA frame (frame after next frame)" and the ASCH for transmitting data including ACKCH is the first slot. As shown in FIG. 6, when the data frame reception timing acquiring unit 38 acquires the downlink frame in which the data frame for which an error is detected is received, the retransmission request transmission timing identifying unit 40 identifies the uplink slot (here, the first slot) of the "frame after the next frame" of the downlink frame as the transmission timing of the retransmission request (NACK) for the data frame.

Figure 3:
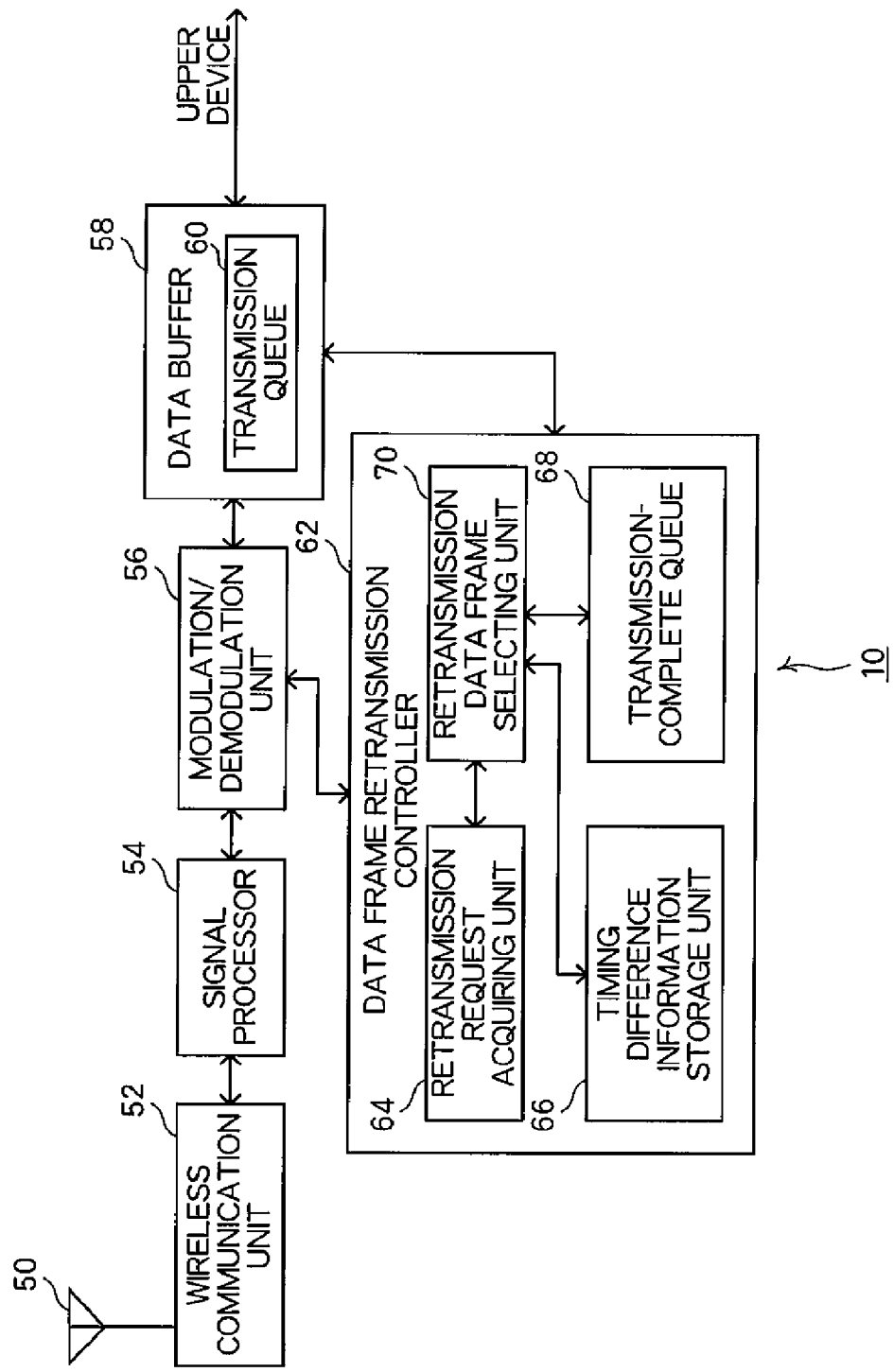
FIG. 3 is a functional block diagram of a base station device according to the first embodiment of the present invention.

Next, FIG. 3 is a block diagram of the base station device 10. As shown in FIG. 3, the base station device 10 includes an adaptive array antenna 50, a wireless communication unit 52, a signal processor 54, a modulation/demodulation unit 56, a data buffer 58, and a data frame retransmission controller 62.

The adaptive array antenna 50 is an array of a plurality of antennas. The adaptive array antenna 50 receives a wireless signal transmitted from the mobile station devices 12 at the antennas and outputs the received signal to the reception unit 22. The adaptive array antenna 50 also transmits a signal which is input from the wireless communication unit 52 through the antennas. The reception and transmission are switched in a time divisional manner.

The wireless communication unit 52 includes a low noise amplifier, a down-converter, and an up-converter. The wireless communication unit 52 down-converts the wireless signal received by the adaptive array antenna 50 and outputs to the signal processor 24. The wireless communication unit 52 also up-converts the transmission signal which is input from the signal processor 24 into a wireless signal, amplifies the wireless signal to a transmission power level, and supplies to the adaptive array antenna 50.

The signal processor 54 includes a space division multiplex processor and a time division multiplex processor. The signal processor 54 acquires a baseband OFDM signal from a signal which is input from the wireless communication unit 52 and outputs to the modulation/demodulation unit 56. In other words, because space division multiple access (SDMA), time division multiple access (TDMA), and orthogonal frequency division multiple access (OFDMA) are applied to the signal which is input from the wireless communication unit 52, the signal processor 54 applies a space division process related to a weight control of the adaptive array antenna 50 and time division process on the signal. Then, the signal processor 54 executes processes such as a symbol synchronization and removal of guard interval signal on the separated signal, and acquires the baseband OFDM signal. The baseband OFDM signal acquired in this manner is output to the modulation/demodulation unit 56.

The signal processor 54 also adds the guard interval signal to the baseband OFDM signal which is input from the modulation/demodulation unit 56, creates a signal to which the time division multiplex process and the space division multiplex process related to the weight control of the adaptive array antenna 50 are applied, and outputs to the wireless communication unit 52.

The modulation/demodulation unit 56 includes an A/D converter, an FFT unit, a channel estimation unit, and a demapping unit. The modulation/demodulation unit 56 OFDM-demodulates the baseband OFDM signal which is input from the signal processor 54 and outputs the acquired received data frame (data corresponding to 1 uplink frame) from each mobile station device 12 to the data buffer 58. The modulation/demodulation unit 56 also includes a symbol mapping unit, an IFFT unit, and a D/A converter. The modulation/demodulation unit 56 OFDM-modulates a transmission data frame (data corresponding to 1 downlink frame) which is input from the data buffer 58 (a transmission queue 60), and outputs the acquired baseband OFDM signal to the signal processor 54. The contents of the process in the modulation/demodulation unit 56 are approximately common with the contents of the processes in the modulation/demodulation unit 26 in the mobile station device 12, and, thus, will not be described here in detail.

The data buffer 58 includes the transmission queue 60. The data buffer 58 temporarily stores the received data frames from the mobile station devices 12 which are input from the modulation/demodulation unit 56 and sequentially outputs received data which is acquired by connecting the received data frames to a predetermined upper device (not shown). The data buffer 58 also temporarily stores transmission data frames to each of the mobile station devices 12 which are input from the upper device and the data frame retransmission controller 62 and sequentially outputs to the modulation/demodulation unit 56 through the transmission queue 60.

The transmission queue 60 holds the transmission data frames in a list structure of a First In First Out (FIFO) method. The transmission data frame or the retransmission data frame which is input from the data frame retransmission controller 62 is added to the transmission queue 60 in each TDMA frame. In addition, the first data frame in the transmission queue 60 is extracted in each TDMA frame and is output to the modulation/demodulation unit 56.

The data frame retransmission controller 62 includes a retransmission request acquiring unit 64, a timing difference information storage unit 66, a transmission-complete queue (transmitted data frame storage unit) 68, and a retransmission data frame selecting unit 70. The data frame retransmission controller 62 controls, in response to a retransmission request transmitted from each mobile station device 12, retransmission of the data frame corresponding to the retransmission request.

The retransmission request acquiring unit 64 acquires, in each TDMA frame, the ACKCH of the PHY header shown in FIG. 5 from the received data which is output from the data buffer 58, and acquires a reception timing of the data frame including the ACKCH. The reception timing may be identified by a downlink slot or a downlink frame in which the retransmission request is received, and information on which timing is used as the reception timing is shared between the base station device 10 and each mobile station device 12 in advance.

The timing difference information storage unit 66 stores timing difference information indicating a timing difference between the transmission timing of the data frame and the reception timing of the retransmission request for the data frame. The timing difference information may be time or the number of TDMA slots or the number of TDMA frames, and is the same information as the timing difference information stored in the timing difference information storage unit 42 of the mobile station device 12. In other words, the timing difference between the transmission (reception) timing of the data frame and the reception (transmission) timing of the retransmission request for the data frame is shared between the base station device 10 and each mobile station device 12 in advance. Because of this configuration, the base station device 10 can identify the timing of transmission of the data frame corresponding to the ACK or the NACK based on the reception timing of the ACK or the NACK even though the sequence number of the received data frame is not added to the ACK or the NACK transmitted from the mobile station device 12. The timing difference information may be defined in the mobile communication system 1 in advance or may be determined between the base station device 10 and each mobile station device 12 at the start of the communication.

The transmission-complete queue 68 holds at least some of the plurality of data frames transmitted to the mobile station devices 12 in a list structure of a First In First Out (FIFO) method, and functions as a transmitted data frame storage unit. The first data frame in the transmission queue 60 is transmitted in each TDMA frame, and with the transmission, the data frame is extracted from the transmission queue 60 and added to the transmission-complete queue 68. In the transmission-complete queue 68, an upper limit is set in the number of transmitted data frames to be held and the transmission-complete queue 68 is configured to allow identification of the timing of transmission of each of the data frames.

More specifically, the transmission-complete queue 68 has a size corresponding to the timing difference information (information indicating a timing difference between the transmission timing of a data frame and a reception timing of the retransmission request for the data frame) stored in the timing difference information storage unit 66. For example, when the timing difference information is "1 TDMA frame", the transmission-complete queue 68 has a size to allow holding of 2 TDMA frames acquired by adding 1 TDMA frame to the timing difference information, that is, the transmission-complete queue 68 has a size to allow holding of a maximum of two transmitted data frames. Similarly, when the timing difference information is 2 TDMA frames, the transmission-complete queue 68 has a size to allow holding of a maximum of three transmitted data frames. With this configuration, the ACKCH acquired by the retransmission request acquiring unit 64 in each TDMA frame would correspond to the first data frame in the transmission-complete queue 68 at the timing of reception of the ACKCH.

Because of this, when the NACK is stored in the ACKCH acquired by the retransmission request acquiring unit 64, the first data frame is extracted from the transmission-complete queue 68 as the retransmission data frame and is added to the transmission queue 60. When, on the other hand, the ACK is stored in the ACKCH, the first data frame does not need to be retransmitted and is deleted.

In this configuration, the transmission-complete queue 68 is used as the transmitted data frame storage unit, but the transmitted data frame storage unit does not need to have the queue structure, and it is sufficient that the transmitted data frame storage unit stores at least some of the plurality of data frames transmitted to the mobile station devices 12 in a manner to allow identification of the timing of transmission of each of the data frames. For example, it is possible to store the transmitted data frame in correlation to an identification number of the TDMA frame in which the data frame was transmitted.

The retransmission data frame selecting unit 70 selects, based on a reception timing of the retransmission request transmitted from a mobile station device 12, a data frame to be retransmitted from among the plurality of data frames transmitted to the mobile station device 12. More specifically, based on the timing of reception of the ACKCH from the mobile station device 12 acquired by the retransmission request acquiring unit 64 and the timing difference information (information indicating the timing difference between the transmission timing of the data frame and the reception timing of the retransmission request for the data frame) stored in the timing difference information storage unit 66, the retransmission data frame selecting unit 70 identifies the transmission timing of the data frame corresponding to the ACKCH. Based on the identified transmission timing, the retransmission data frame selecting unit 70 selects, from among the plurality of data frames transmitted in the past to the mobile station device 12, the data frame transmitted at the identified timing from the transmission-complete queue 68.

As described above, in the present embodiment, because the transmission-complete queue 68 has a size corresponding to the timing difference information stored in the timing difference information storage unit 66, the ACKCH acquired in each TDMA frame by the retransmission request acquiring unit 64 corresponds to the first data frame in the transmission-complete queue 68 at the timing of reception of the ACKCH. Because of this configuration, when the NACK is stored in the ACKCH, the retransmission data frame selecting unit 70 selects (extracts) the first data frame as the retransmission data frame from the transmission-complete queue 68 and adds to the transmission queue 60. When, on the other hand, the ACK is stored in the ACKCH, the retransmission data frame selecting unit 70 deletes the first data frame for which no retransmission is required from the transmission-complete queue 68.

Figure 7:
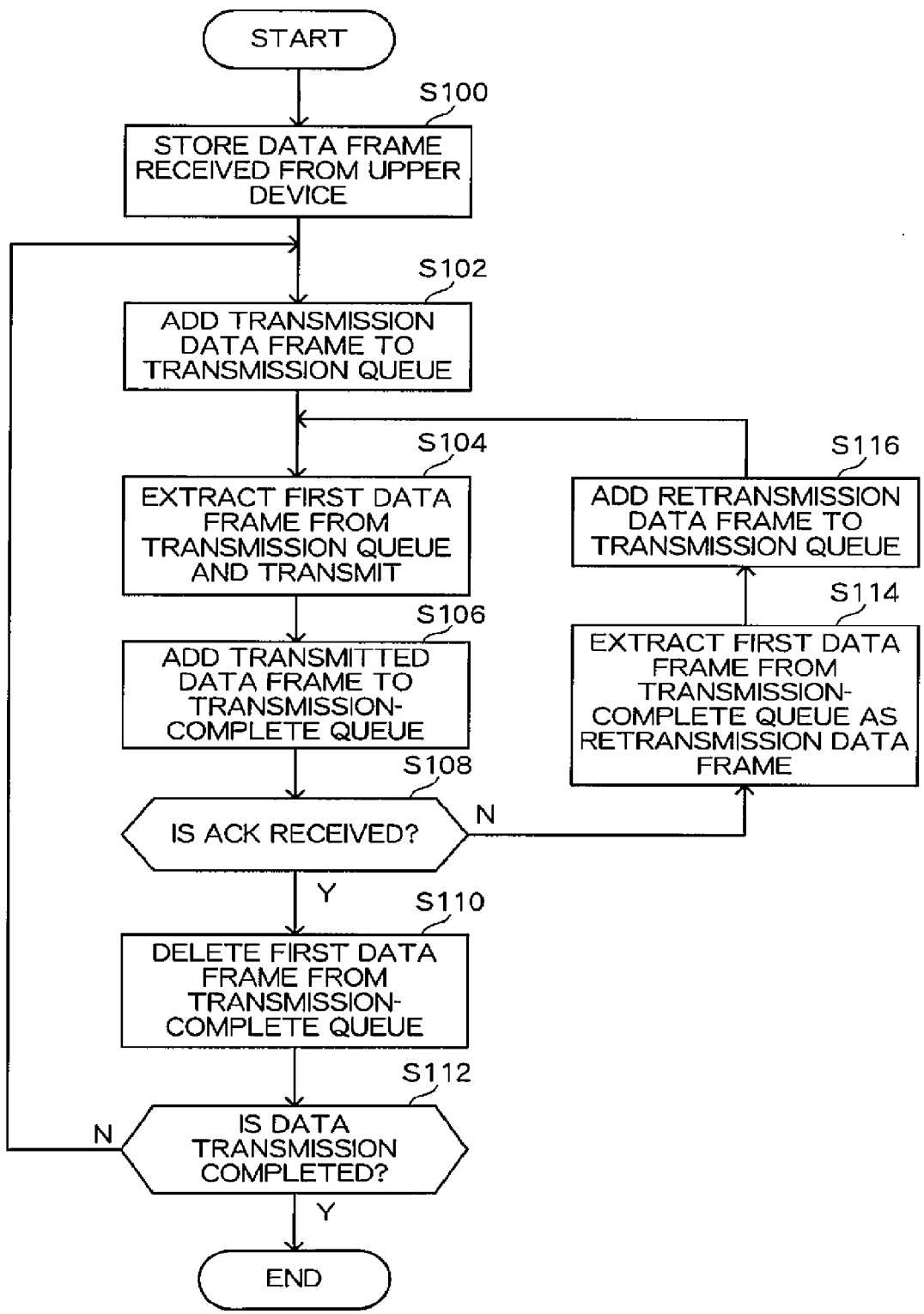
FIG. 7 is a flowchart showing a data frame transmission (and retransmission) process in the base station device.

Next, an operation of the base station device 10 will be described. FIG. 7 is a flowchart showing a data frame transmission (and retransmission) process in the base station device 10.

As shown in FIG. 7, first, in a downlink frame, a data frame including a transmission packet received from an upper device is stored in the data buffer 58 (S100). The data frame is added to the transmission queue 60 (S102). Then, the first data frame is extracted from the transmission queue 60 and is converted to a transmission signal, and the transmission signal is transmitted to the mobile station device 12 (S104). The transmitted data frame is added to the transmission-complete queue 68 (S106).

Then, in an uplink frame, received data from the mobile station device 12 is acquired. The retransmission request acquiring unit 64 acquires the ACKCH from the PHY header in the received data and determines whether the value stored in the ACKCH is ACK or NACK (S108). When the value is ACK, the retransmission data frame selecting unit 70 deletes the first data frame from the transmission-complete queue 68 (S110). Then, it is determined whether or not the data transmission is completed (S112), and, if the transmission is not completed, the processes from S102 are executed in the next downlink frame.

When, on the other hand, it is determined in S108 that the value stored in the ACKCH is NACK, the retransmission data frame selecting unit 70 extracts the first data frame from the transmission-complete queue 68 as a retransmission data frame (S114) and adds to the transmission queue 60 (S116). Then, the processes from S104 are executed in the next downlink frame.

Figure 8:
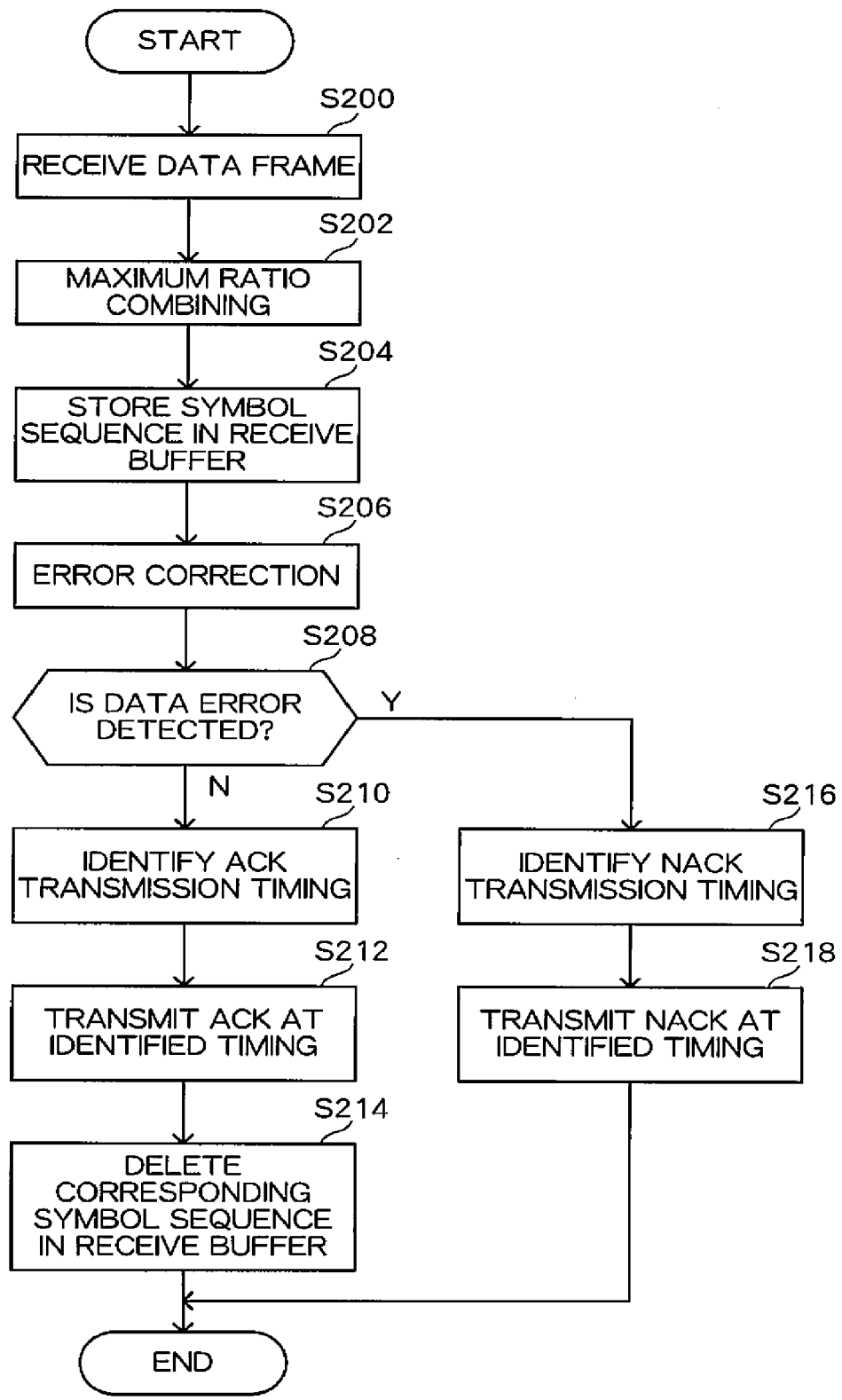
FIG. 8 is a flowchart showing an error correction process of a received data frame in the mobile station device.

Next, the operation of the mobile station device 12 will be described. FIG. 8 is a flowchart showing an error correction process of the received data frame in the mobile station device 12.

First, in a downlink frame, a data frame is received from the base station device 10 (S200). Then, the maximum ratio combining unit 28 maximum-ratio combines the symbol sequence created from the received data frame which is input from the modulation/demodulation unit 26 and the symbol sequence which is read from the receive buffer 30 based on the sequence number of the received data frame (S202). The combined symbol sequence is stored in the receive buffer 30 in correlation to the sequence number of the received data frame (S204). The combined symbol sequence is converted to a bit sequence in the error correcting unit 32 and an error correction is applied (S206).

Next, the error detecting unit 34 determines whether or not there is a data error in the data after error correction which is input from the error correcting unit 32 (S208) and outputs the detection result to the retransmission request transmission controller 36. When no data error is detected, the retransmission request transmission timing identifying unit 40 identifies a transmission timing of the ACK for the received data frame based on the reception timing of the received data frame acquired by the data frame reception timing acquiring unit 38 and the timing difference information stored in the timing difference information storage unit 42 (S210). The retransmission request transmission controller 36 then outputs the ACK to the modulation/demodulation unit 26 such that the ACK is transmitted at a timing identified in S210 (for example, the uplink frame after the next uplink frame). The ACK which is input to the modulation unit 26 is stored in the ACKCH of the PHY header without the sequence number of the data frame and is transmitted (S212). Then, the retransmission request transmission controller 36 deletes the received data frame corresponding to the ACK from the receive buffer 30 (S214).

When, on the other hand, a data error is detected in S208, the retransmission request transmission timing identifying unit 40 identifies the transmission timing of the NACK for the received data frame based on the reception timing of the received data frame acquired by the data frame reception timing acquiring unit 38 and the timing difference information stored in the timing difference information storage unit 42 (S216). The retransmission request transmission controller 36 outputs the NACK to the modulation/demodulation unit 26 such that the NACK is transmitted at the timing identified in S216 (for example, the uplink frame following the next uplink frame). The NACK which is input to the modulation unit 26 is stored in the ACKCH of the PHY header without the sequence number of the data frame and is transmitted (S218).

According to the above-described embodiment, because the base station device 10 and the mobile station device 12 share the timing difference (time interval) between the transmission (reception) timing of the data frame and the reception (transmission) timing of the retransmission request for the data frame, even when the sequence number of the data frame is omitted in the retransmission request, the base station device 10 can identify to which data frame the received retransmission request corresponds. Because of this configuration, the size of the PHY header section can be reduced and the size of the PHY body section can be expanded.

The present invention is not limited to the above-described embodiment and various modified embodiments can be employed. For example, in the above description, the present invention is applied to a mobile communication system which uses SDMA, TDMA, and OFDMA in combination, but the present invention can also be applied to a general communication system having a transmitting device and a receiving device and which applies an automatic repeat request method of data frame.

In addition, in the above-described embodiment, a configuration is described in which the mobile station device 12 requests retransmission of the data frame and the base station device 10 retransmits the data frame in response to the request, but the present invention can also be applied to a configuration in which the roles of the mobile station device 12 and the base station device 10 are exchanged or to a configuration in which each of the mobile station device 12 and the base station device 10 has the functions of the retransmission request and the data frame retransmission.

Second Embodiment

Figure 9:
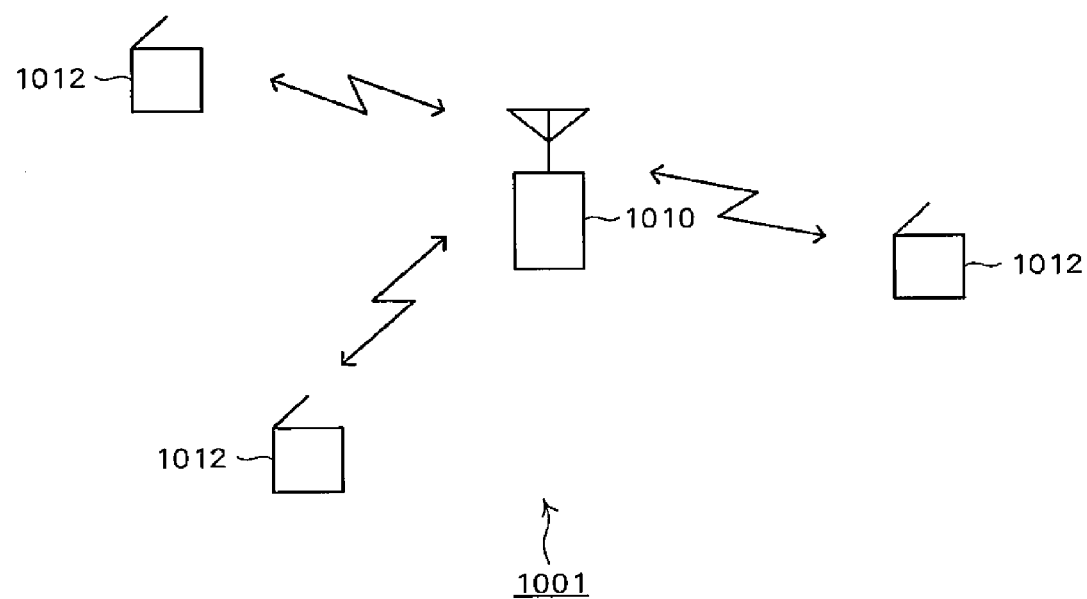
FIG. 9 is an overall configuration diagram of a mobile communication system according to a second embodiment of the present invention.

FIG. 9 is an overall configuration diagram of a mobile communication system according to a second embodiment of the present invention. As shown in FIG. 9, a mobile communication system 1001 includes a base station device 1010 and a plurality of mobile station devices 1012 (here, three mobile station devices).

Each of the mobile station devices 1012 wirelessly communicates with the base station device 1010, and may be, for example, a portable cellular phone, a personal digital assistant, or a communication card. In this configuration, the mobile station device 1012 transmits and receives data to and from the base station device 1010 according to a TDD system and executes a multiplex communication according to a TDMA system and an OFDMA system. The base station device 1010 includes an adaptive array antenna as will be described below, and executes a multiplex communication with each of the plurality of mobile station devices 1012 at a same time slot and a same carrier frequency according to a space division multiple access (SDMA) using the adaptive array antenna. With such a configuration, a bidirectional communication with the plurality of mobile station devices 1012 is realized with a very high frequency usage efficiency.

Figure 12:
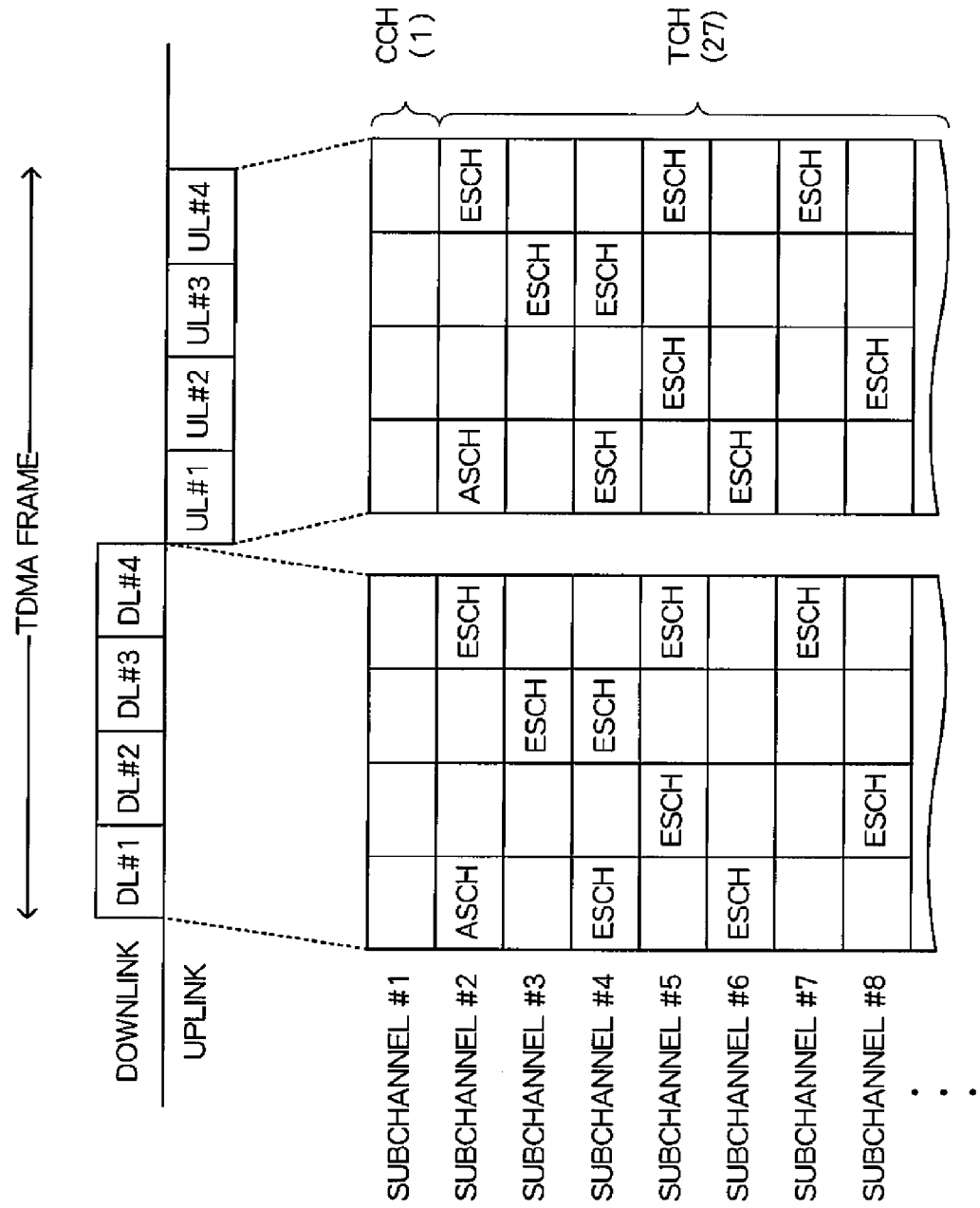
FIG. 12 is a diagram showing an example of a time slot structure according to TDMA/TDD and a subchannel structure according to OFDMA.

FIG. 12 is a diagram showing an example of a time slot structure (1 TDMA frame) according to TDMA/TDD and a subchannel structure according to OFDMA. As shown in FIG. 12, each of a downlink (wireless transmission path from the base station device 1010 to the mobile station device 1012) and an uplink (wireless transmission path from the mobile station device 1012 to the base station device 1010) includes 4 time slots. Each time slot includes 28 subchannels, one of which is used as a control channel (CCH) and the remaining 27 of which are used as traffic channels (TCH).

The base station device 1010 assigns at least some of a total of 108 subchannels (27 subchannels×4 slots) used as the traffic channels to each of the mobile station devices 1012 in each of the downlink and the uplink. More specifically, as shown in FIG. 12, the base station device 1010 assigns one anchor subchannel (ASCH) and assigns one or a plurality of extra subchannels (ESCH) as necessary, for each mobile station device 1012.

The ASCH is a subchannel which is determined when a link is established (at the start of communication) and notified to each of the mobile station devices 1012 using the CCH, and is primarily used for transmitting and receiving control information such as MAP information and ACK information. The MAP information is a bit sequence having a length of 108 bits indicating one or a plurality of ESCH to be used in the next TDMA frame (next uplink frame and downlink frame) after the MAP information is received. More specifically, a bit corresponding to ESCH to be assigned to the mobile station device 1012 in the next TDMA frame is indicated with "1" and bits corresponding to the other subchannels (ASCH, ESCH to be assigned to the other mobile station devices 1012, and idle subchannel) are indicated with "0". The ACK information stores a sequence number of the data frame received in the uplink and ACK (Acknowledge) or NACK (Negative Acknowledge) indicating presence or absence of an error in the data frame. In particular, when the ACK information stores NACK, the ACK information represents a retransmission request of the data frame.

The ESCH, on the other hand, is a subchannel which is determined after the link is established and is identified by the MAP information notified to the mobile station device 12 using the ASCH, and is primarily used for transmission and reception of communication data. As shown in FIG. 12, the ASCH and the ESCH are assigned to the same subchannel in the downlink slot and the uplink slot having corresponding slot numbers (DL#1 and UP#1, DL#2 and UL#2, . . . ).

Figure 10:
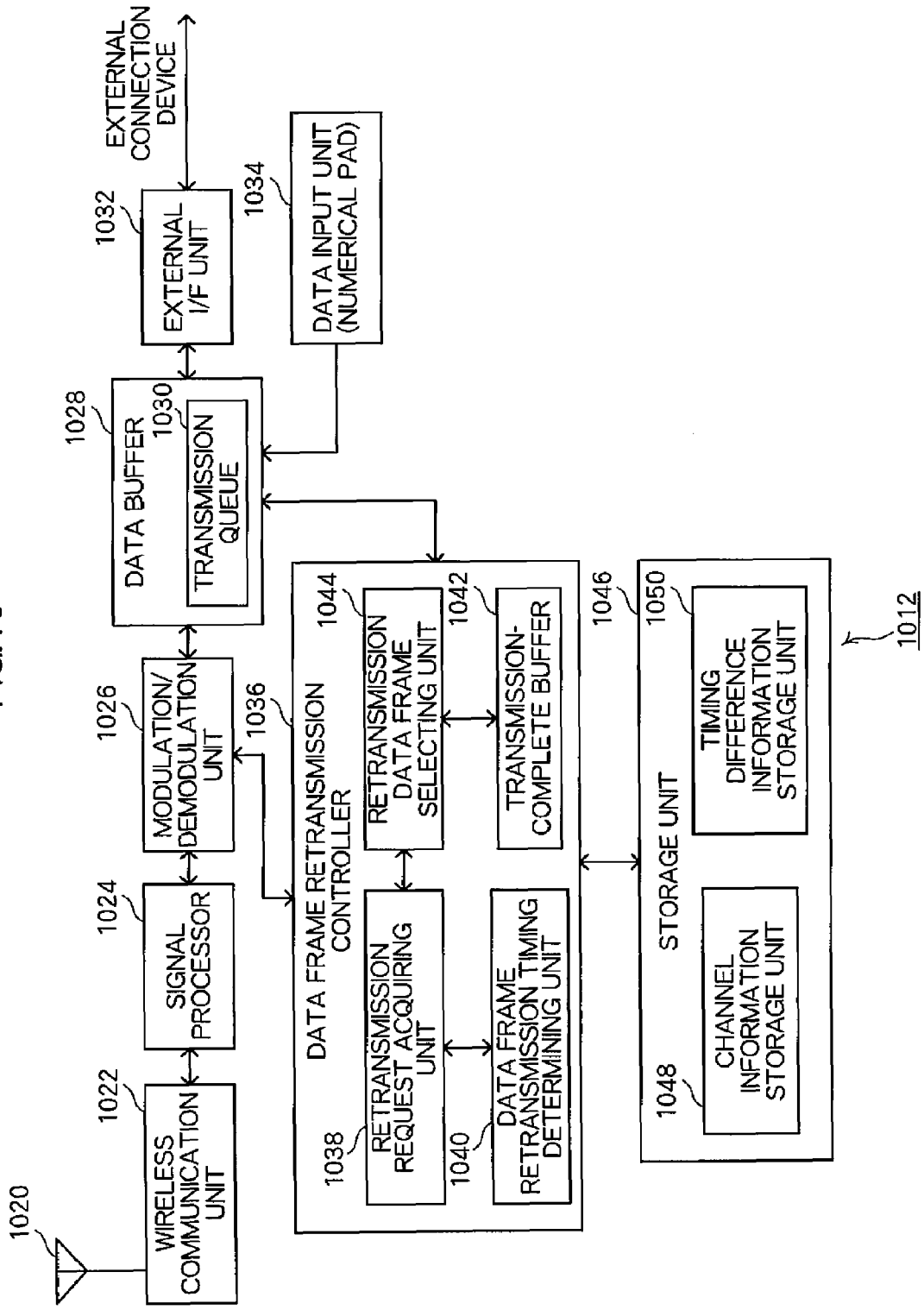
FIG. 10 is a functional block diagram of a mobile station device according to the second embodiment of the present invention.

FIG. 10 is a functional block diagram of the mobile station device 1012. As shown in FIG. 10, the mobile station device 1012 includes an antenna 1020, a wireless communication unit 1022, a signal processor 1024, a modulation/demodulation unit 1026, a data buffer 1028, an external I/F unit 1032, a data input unit 1034, a data frame retransmission controller 1036, and a storage unit 1046.

The wireless communication unit 1022 includes a low noise amplifier, a down-converter, and an up-converter. The wireless communication unit 1022 down-converts a wireless signal from the base station device 1010 received by the antenna 1020 and outputs to the signal processor 1024. The wireless communication unit 1022 also up-converts a transmission signal which is input from the signal processor 1024 into a wireless signal, amplifies the wireless signal to a transmission power level, and transmits from the antenna 1020.

The signal processor 1024 applies processes such as symbol synchronization and removal of a guard interval (GI) signal on the signal which is input from the wireless communication unit 1022, to acquire a baseband OFDM signal, and outputs to the modulation/demodulation unit 1026. The signal processor 1024 also adds a guard interval signal to a baseband OFDM signal which is input from the modulation/demodulation unit 1026 and outputs to the wireless communication unit 1022.

The modulation/demodulation unit 1026 includes an A/D converter, an FFT unit, a channel estimation unit, and a de-mapping unit. The modulation/demodulation unit 1026 OFDM-demodulates the baseband OFDM signal which is input from the signal processor 1024 and outputs the acquired received data frame to the data buffer 1028. More specifically, the modulation/demodulation unit 1026 applies an A/D conversion on the baseband OFDM signal and then applies an FFT in the FFT unit, to acquire subcarrier components of the OFDM symbol. Then, after the modulation/demodulation unit 1026 applies a predetermined channel estimation process or the like, the modulation/demodulation unit 1026 connects the subcarrier components corresponding to a plurality of subchannels (one ASCH and one or a plurality of ESCH) assigned by the base station device 1010 referring to the assignment status of subchannels stored in a channel information storage unit 1048, to create a symbol sequence. The modulation/demodulation unit 1026 outputs the received data frame acquired by decoding the symbol sequence to the data buffer 1028.

The modulation/demodulation unit 1026 also includes a symbol mapping unit, an IFFT unit, and a D/A converter. The modulation/demodulation unit 1026 OFDM-modulates a transmission data frame which is input from the data buffer 1028 (transmission queue 1030) and outputs the acquired baseband OFDM signal to the signal processor 1024. More specifically, the modulation/demodulation unit 1026 divides the transmission data frame referring to the assignment status of subchannels stored in the channel information storage unit 1048, and creates transmission data corresponding to each of the plurality of subchannels (one ASCH and one or a plurality of ESCH) assigned by the base station device 1010. Then, the modulation/demodulation unit 1026 converts the created transmission data of each of the subchannels into a symbol sequence through a symbol mapping, and distributes the symbol sequence over the subcarriers of the subchannel. The modulation/demodulation unit 1026 then applies an IFFT in the IFFT unit and outputs the baseband OFDM signal acquired through a D/A conversion to the signal processor 1024.

The data buffer 1028 includes the transmission queue 1030. The data buffer 1028 temporarily stores the received data frames from the base station device 1010 which are input from the modulation/demodulation unit 1026 and sequentially outputs received data which is acquired by connecting the received data frames to an upper device (not shown) through the predetermined external I/F unit 1032. The data buffer 1028 also temporarily stores transmission data frames to each of the mobile station devices 1012 which are input from the upper device through the external I/F unit 1032 and data which is input from the data input unit 1034 such as a numerical pad, creates a transmission data frame based on these transmission data, and sequentially outputs to the modulation/demodulation unit 1026 through the transmission queue 1030.

The transmission queue 1030 holds the transmission data frame in a list structure of a First In First Out (FIFO) method. The transmission data frame or the retransmission data frame which is input from the data frame retransmission controller 1036 is added to the transmission queue 1030 in each TDMA frame. The first data frame in the transmission queue 1030 is extracted in each TDMA frame and is output to the modulation/demodulation unit 1026.

The storage unit 1046 includes a memory, and also includes the channel information storage unit 1048 and a timing difference information storage unit 1050.

The channel information storage unit 1048 stores the subchannels (one ASCH and one or a plurality of ESCH) assigned by the base station device 1010. Because the ASCH is the subchannel for transmitting the ACK information, the slot position of the ASCH represents the reception timing (reception slot) of the ACK information.

The timing difference information storage unit 1050 stores, in correlation to information indicating a reception timing of a NACK, timing difference information indicating a timing difference which satisfies a condition related to a reference required time. Here, the reference required time is the minimum time which is required for a process from the reception of the NACK to the retransmission of the data frame (hereinafter referred to as data frame retransmission process), and is set, for example, with reference to the mobile station device 1012 having the slowest process executing speed (the lowest processing capability). The timing difference which satisfies a condition related to the reference required time is a timing difference between the reception timing of the NACK and the retransmission timing of the data frame corresponding to the NACK, and is a timing difference which is greater than or equal to the reference required time and which is as close to the reference required time as possible. The reception timing of the NACK may be identified by the reception slot of the NACK, and the retransmission timing of the data frame may be identified by the transmission slot of the retransmission data frame or the transmission frame including the transmission slot.

FIG. 11 is a diagram showing an example of the timing difference information storage unit 1050. As shown in FIG. 11, the timing difference information storage unit 1050 stores timing difference information (timing 1, timing 2) in correlation to the slot position of the ASCH (subchannel for transmitting the ACK information). This shows the correspondence relationship between the slot position of the ASCH indicating the reception slot of the NACK and the transmission frame indicating the timing of the retransmission of the data frame corresponding to the NACK, and the transmission frame is set such that the reference required time required for the data frame retransmission process in the mobile station device 1012 is secured and is minimized. In other words, the information shown in the timing difference information storage unit 1050 shown in FIG. 11 indicates, for each slot position of ASCH indicating the reception slot of the NACK, an optimum transmission frame which secures the reference required time and minimizes the data frame retransmission process time. Because of this, for example, when the NACK is received in the "first slot" (when the slot position of ASCH is the "first slot"), if the data frame is retransmitted in the next frame of the reception slot (timing 1), the data frame retransmission process time is minimized.

The data frame retransmission controller 1036 includes a retransmission request acquiring unit 1038, a data frame retransmission timing determining unit 1040, a transmission-complete buffer 1042, and a retransmission data frame selecting unit 1044. The data frame retransmission controller 1036 controls, in response to a retransmission request transmitted from the base station device 1010, retransmission of the data frame corresponding to the retransmission request.

The retransmission request acquiring unit 1038 acquires the ACK information in each TDMA frame from the received data which is output from the data buffer 1028 and acquires the reception timing (reception slot) of the ACK information.

The data frame retransmission timing determining unit 1040 determines, based on the reception timing of the NACK, the retransmission timing (transmission slot or transmission frame) of the data frame corresponding to the NACK so that the timing difference between the reception timing of the NACK and the retransmission timing of the data frame corresponding to the NACK is close to the reference required time required for the data frame retransmission process.

FIG. 13 is a diagram for explaining a retransmission timing of the data frame identified by the data frame retransmission timing determining unit 1040. As shown in FIG. 13(*a*), when the slot position of the ASCH indicating the reception slot of the NACK is the first slot, the data frame retransmission timing determining unit 1040 determines the next transmission frame of the NACK reception slot as the data frame retransmission timing. This determination is based on design and experimental results that all mobile station devices 1012 can complete the retransmission process of the data frame within time period of approximately 3 slots from the NACK reception slot to the next transmission frame. In this case, the data frame retransmission process time can be shortened by at least 1 TDMA frame compared to the related art. When, on the other hand, the slot position of the ASCH (NACK reception slot) is the fourth slot as shown in FIG. 13(*b*), the data frame retransmission timing determining unit 1040 determines a transmission frame following the next transmission frame of the NACK reception slot as the data frame retransmission timing. This determination is based on design and experimental results that it is difficult for all mobile station devices 1012 to complete the data frame retransmission process within a time period from the NACK reception slot to the next transmission frame (about 0 slot).

The data frame retransmission timing determining unit 1040 may read the timing difference information from the timing difference information storage unit 1050 in correlation to the slot position of the ASCH indicating the reception slot of the NACK and determine a retransmission timing (transmission frame) of the data frame corresponding to the NACK based on the reception slot of the NACK and the read timing difference information.

The transmission-complete buffer 1042 temporarily stores at least some of the plurality of data frames transmitted to the base station device 1010 in correlation to the sequence number of each of the data frames. The first data frame in the transmission queue 1030 is transmitted in each TDMA frame, and, with the transmission, the data frame is extracted from the transmission queue 1030 and stored in the transmission-complete buffer 1042.

The retransmission data frame selecting unit 1044 selects, when the NACK is stored in the ACK information acquired by the retransmission request acquiring unit 1038, a data frame to be retransmitted from the transmission-complete buffer 1042 based on the sequence number of the data frame stored in the ACK information, and adds the data frame to the transmission queue 1030. On the other hand, when the ACK is stored in the ACK information, the retransmission data frame selecting unit 1044 deletes the data frame corresponding to the sequence number of the data frame stored in the ACK information from the transmission-complete buffer 1042.

An operation of the mobile station device 1012 will now be described.

Figure 14:
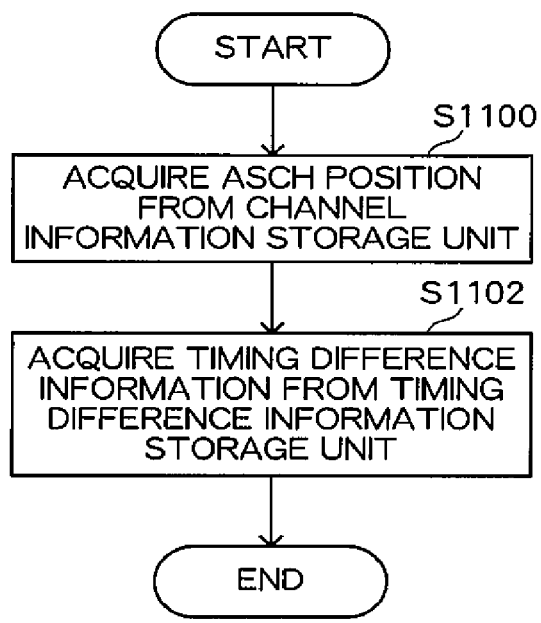
FIG. 14 is a flowchart showing a process for acquiring timing difference information in the mobile station device.

FIG. 14 is a flowchart showing a process of acquiring the timing difference information at the start of the communication. As shown in FIG. 14, when the communication is started, the channel information storage unit 1048 stores one ASCH and one or a plurality of ESCH assigned by the base station device 1010. Then, the data frame retransmission timing determining unit 1040 acquires the slot position of the ASCH from the channel information storage unit 1048 (S1100). In addition, the data frame retransmission timing determining unit 1040 acquires the timing difference information from the timing difference information storage unit 1050 in correlation to the acquired slot position of the ASCH (S1102).

Figure 15:
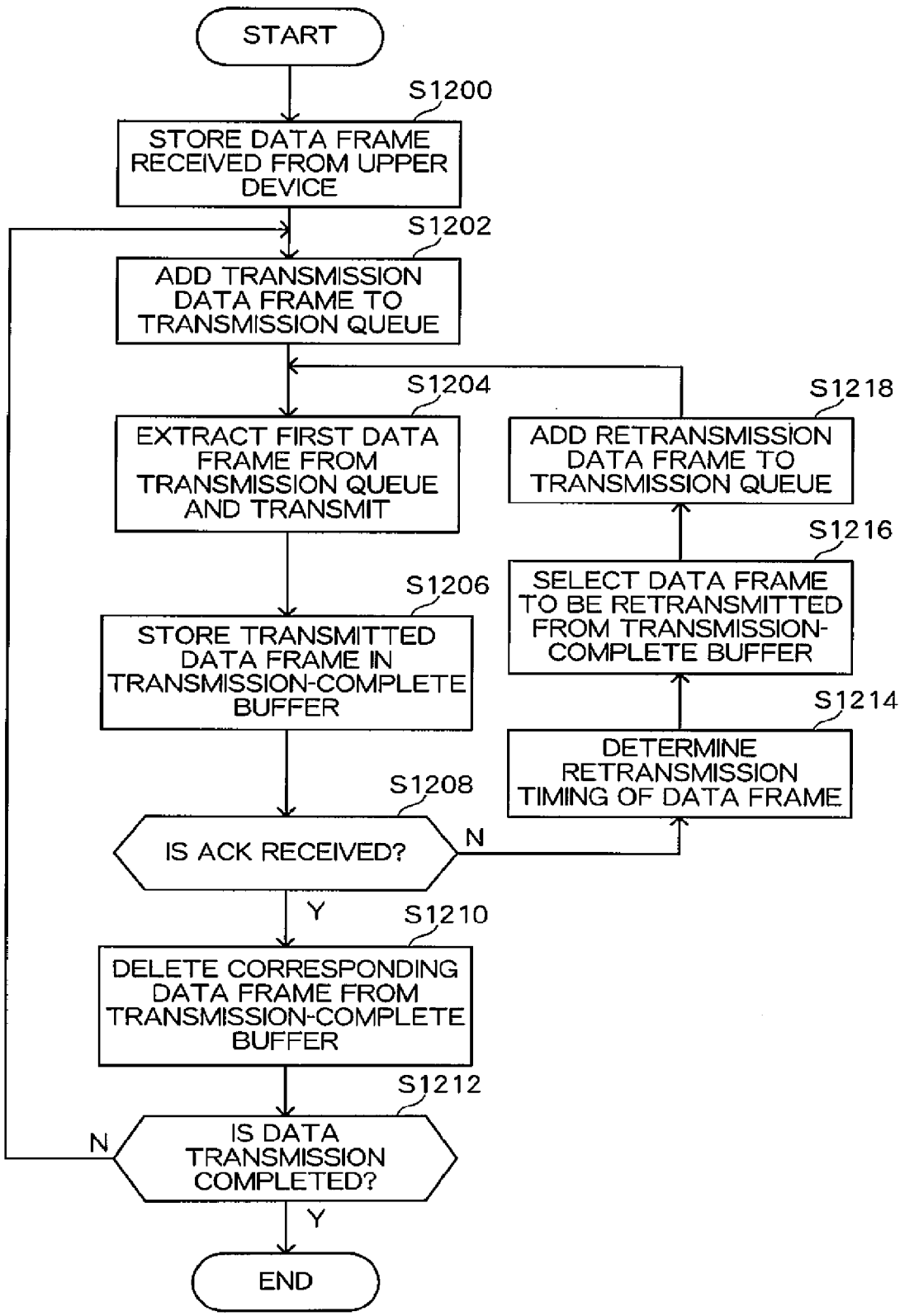
FIG. 15 is a flowchart showing a data frame transmission (and retransmission) process in the mobile station device.

FIG. 15 is a flowchart showing the data frame transmission (and retransmission) in the mobile station device 1012. As shown in FIG. 15, first, in an uplink frame, a data frame including a transmission packet received from an upper device is stored in the data buffer 1028 (S1200). Then, the data frame is added to the transmission queue 1030 (S1202). Next, the first data frame is extracted from the transmission queue 1030, the data frame is converted to a transmission signal, and the transmission signal is transmitted to the base station device 1010 (S1204). The transmitted data frame is stored in the transmission-complete buffer 1042 in correlation to its sequence number (S1206).

Then, in a downlink frame, the received data from the base station device 1010 is acquired. The retransmission request acquiring unit 1038 acquires the ACK information from the received data and determines whether the value stored in the ACK information is ACK or NACK (S1208). When the value is ACK, the retransmission data frame selecting unit 1044 deletes, based on the sequence number of the data frame stored in the ACK information, the corresponding data frame from the transmission-complete buffer 1042 (S1210). It is then determined whether or not the data transmission is completed (S1212), and, if the transmission is not completed, the processes from S1202 are executed in the next uplink frame.

When, on the other hand, the value stored in the ACK information is NACK in S1208, the data frame retransmission timing determining unit 1040 determines the transmission frame of the data frame corresponding to the NACK based on the reception slot of the NACK acquired by the retransmission request acquiring unit 1038 and the timing difference information acquired in S1102 (S1214). Then, the retransmission data frame selecting unit 1044 selects a data frame to be retransmitted from the transmission-complete buffer 1042 based on the sequence number of the data frame stored in the ACK information (S1216), and adds the data frame to the transmission queue 1030 so that the data frame is transmitted in the transmission frame determined in S1214 (S1218). Then, in the next uplink frame, the processes from S1204 are executed.

According to the above-described embodiment, the retransmission timing (transmission frame) of the data frame corresponding to the NACK is determined based on the reception timing (reception slot) of the NACK so that the time from the reception of the NACK to the retransmission of the data frame corresponding to the NACK is close to the reference required time required for the data frame retransmission process. Because of this configuration, it is possible to preferably shorten the time from the reception of the NACK to the retransmission of the data frame.

The present invention is not limited to the above-described embodiment and various modified embodiments may be employed. For example, in the above description, the present invention is applied to the mobile station device in a mobile communication system which uses SDMA, TDMA/TDD, and OFDMA in combination, but the present invention can be applied to a general communication device which employs a TDMA/TDD and an automatic repeat request method of data frame.

In addition, in the above-described embodiment, a configuration is described in which the mobile station device 1012 retransmits a data frame in response to a data frame retransmission request from the base station device 1010, but the present invention can be applied to a configuration in which the roles of the mobile station device 1012 and the base station device 1010 are exchanged or to a configuration in which each of the mobile station device 1012 and the base station device 1010 has the functions of the retransmission request and the data frame retransmission.

Third Embodiment

Figure 16:
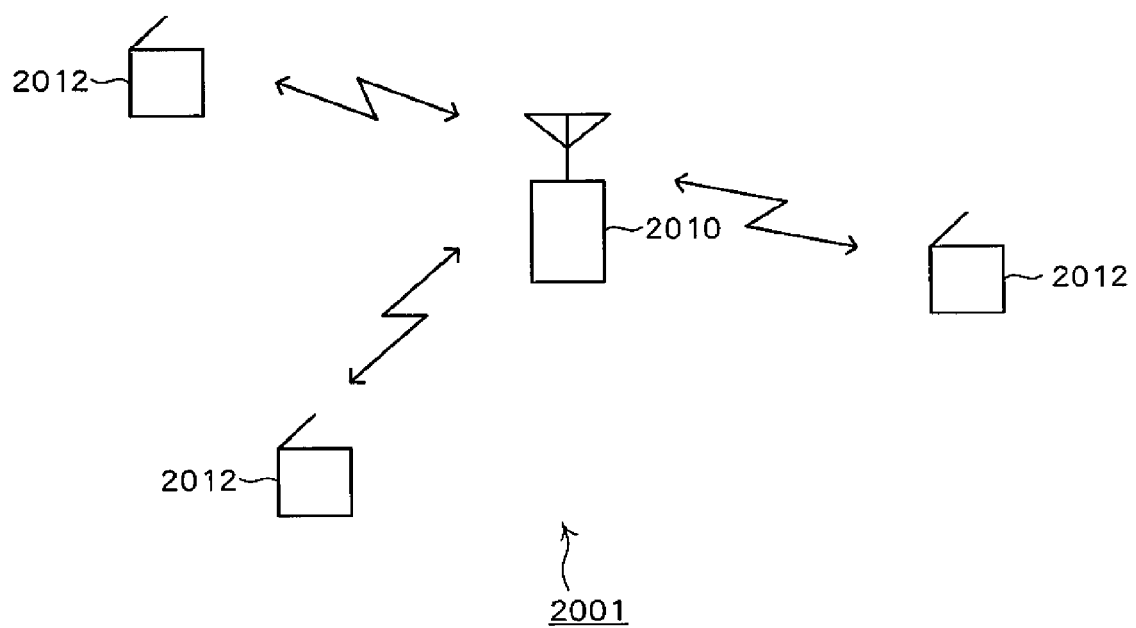
FIG. 16 is an overall configuration diagram of a mobile communication system according to a third embodiment of the present invention.

FIG. 16 is an overall configuration diagram of a mobile communication system according to a third embodiment of the present invention. As shown in FIG. 16, a mobile communication system 2001 includes a base station device 2010 and a plurality of mobile station devices 2012 (here, three mobile station devices).

Each of the mobile station devices 2012 wirelessly communicates with the base station device 2010, and may be, for example, a portable cellular phone, a personal digital assistant, or a communication card. In this configuration, the mobile station device 2012 transmits and receives data to and from the base station device 2010 according to a TDD system and executes a multiplex communication according to a TDMA system and an OFDMA system. The base station device 2010 includes an adaptive array antenna as will be described below, and executes a multiplex communication with each of the plurality of mobile station devices 2012 at a same time slot and a same carrier frequency according to a space division multiple access system (SDMA) using the adaptive array antenna. With such a configuration, a bidirectional communication with the plurality of mobile station devices 2012 is achieved with a very high frequency usage efficiency.

Figure 19:
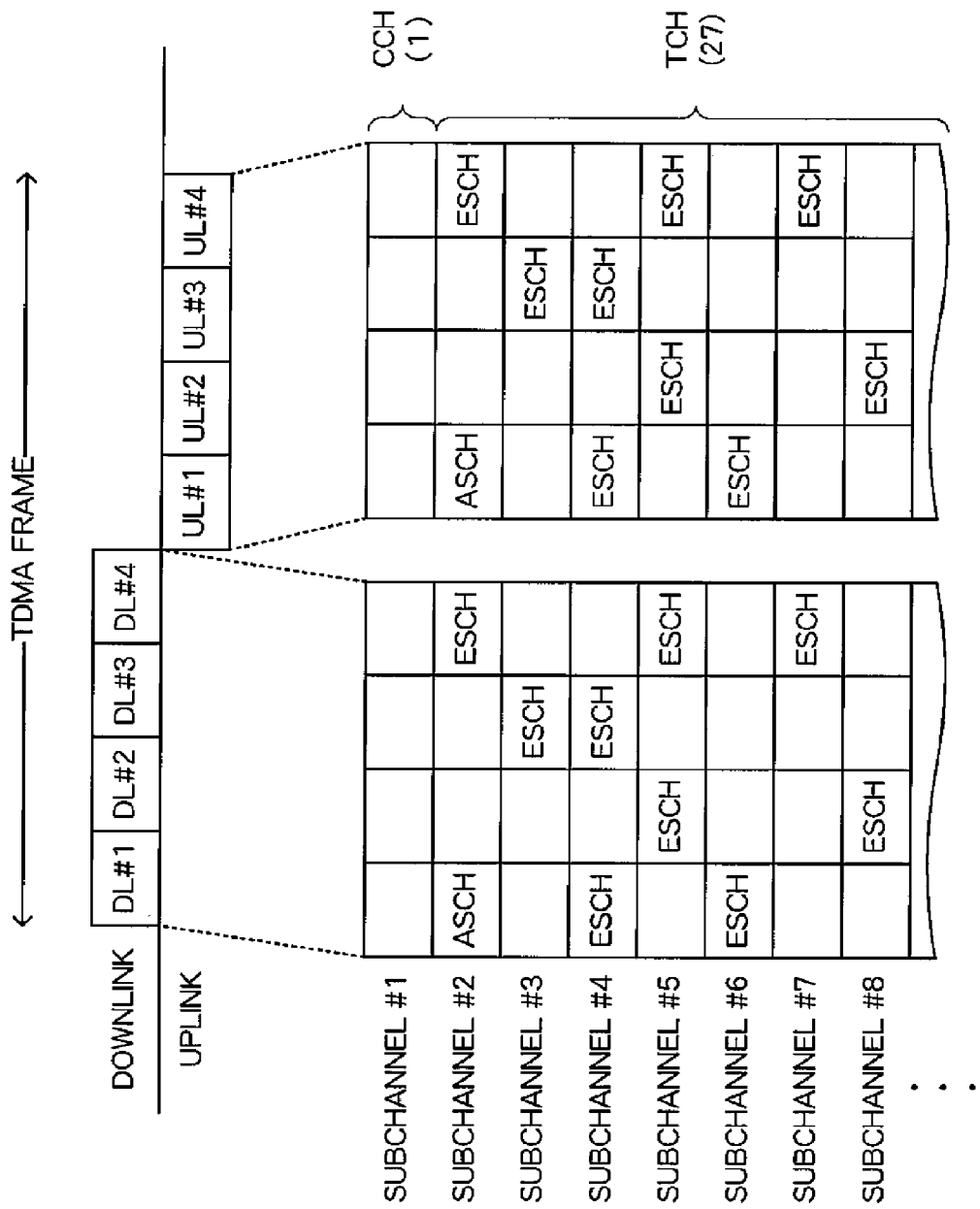
FIG. 19 is a diagram showing an example of a time slot structure according to TDMA/TDD and a subchannel structure according to OFDMA.

FIG. 19 is a diagram showing an example of a time slot structure (1 TDMA frame) according to TDMA/TDD and a subchannel structure according to OFDMA. As shown in FIG. 19, each of a downlink (wireless transmission path from the base station device 2010 to the mobile station device 2012) and an uplink (wireless transmission path from the mobile station device 2012 to the base station device 2010) includes 4 time slots. Each time slot includes 28 subchannels, one of which is used as a control channel (CCH) and the remaining 27 of which are used as traffic channels (TCH).

The base station device 2010 assigns at least some of a total of 108 subchannels (27 subchannels×4 slots) used as the traffic channels to each of the mobile station devices 2012 in each of the downlink and the uplink. More specifically, as shown in FIG. 19, the base station device 2010 assigns one anchor subchannel (ASCH) and assigns one or a plurality of extra subchannels (ESCH) as necessary, for each mobile station device 2012.

The ASCH is a subchannel which is determined when a link is established (at the start of communication) and notified to each of the mobile station devices 2012 using the CCH, and is primarily used for transmission and reception of control information such as MAP information and ACK information. The MAP information is a bit sequence having a length of 108 bits indicating one or a plurality of ESCH to be used in the next TDMA frame (next uplink frame and downlink frame) after the MAP information is received. More specifically, a bit corresponding to ESCH to be assigned to the mobile station device 2012 in the next TDMA frame is indicated with "1", and bits corresponding to the other subchannels (ASCH, ESCH to be assigned to other mobile station devices 2012, and idle subchannel) are indicated with "0". The ACK information stores a sequence number of the data frame received in the uplink and ACK (Acknowledge) or NACK (Negative Acknowledge) indicating presence or absence of an error in the data frame. In particular, when the ACK information stores NACK, the ACK information represents a retransmission request of the data frame.

The ESCH, on the other hand, is a subchannel which is determined after the link is established and is identified by the MAP information notified to the mobile station device 12 using the ASCH, and is primarily used for transmission and reception of communication data. As shown in FIG. 19, the ASCH and the ESCH are assigned in the same subchannels in the downlink slot and uplink slot having corresponding slot numbers (DL#1 and UL#1, DK#2 and UL#2, . . . ).

Figure 17:
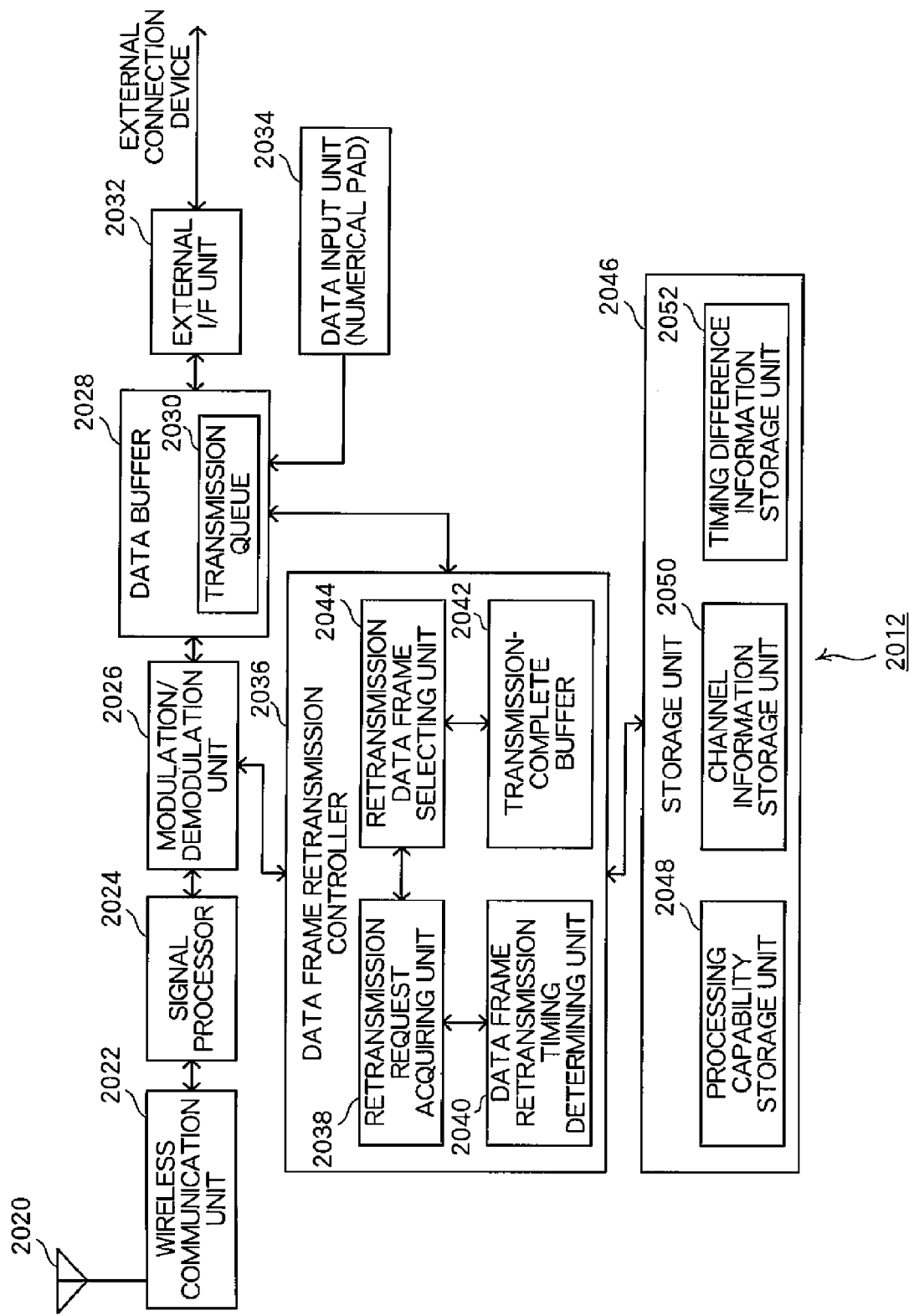
FIG. 17 is a functional block diagram of a mobile station device according to the third embodiment of the present invention.

FIG. 17 is a functional block diagram of the mobile station device 2012. As shown in FIG. 17, the mobile station device 2012 includes an antenna 2020, a wireless communication unit 2022, a signal processor 2024, a modulation/demodulation unit 2026, a data buffer 2028, an external I/F unit 2032, a data input unit 2034, a data frame retransmission controller 2036, and a storage unit 2046.

The wireless communication unit 2022 includes a low noise amplifier, a down-converter, and an up-converter. The wireless communication unit 2022 down-converts a wireless signal from the base station device 2010 received by the antenna 2020 and outputs to the signal processor 2024. The wireless communication unit 2022 also up-converts a transmission signal which is input from the signal processor 2024 into a wireless signal, amplifies the wireless signal to a transmission power level, and transmits from the antenna 2020.

The signal processor 2024 applies processes such as symbol synchronization and removal of a guard interval (GI) signal on the signal which is input from the wireless communication unit 2022, to acquire a baseband OFDM signal, and outputs to the modulation/demodulation unit 2026. In addition, the signal processor 2024 adds a guard interval signal to a baseband OFDM signal which is input from the modulation/demodulation unit 2026 and outputs to the wireless communication unit 2022.

The modulation/demodulation unit 2026 includes an A/D converter, an FFT unit, a channel estimation unit, and a de-mapping unit. The modulation/demodulation unit 2026 OFDM-demodulates the baseband OFDM signal which is input from the signal processor 2024 and outputs the acquired received data frame to the data buffer 2028. More specifically, after the modulation/demodulation unit 2026 A/D-converts the baseband OFDM signal, the modulation/demodulation unit 2026 applies an FFT in the FFT unit, to acquire the subcarrier components of the OFDM symbol. Then, after the modulation/demodulation unit 2026 applies a predetermined channel estimation process or the like, the modulation/demodulation unit 2026 connects the subcarrier components corresponding to a plurality of subchannels (one ASCH and one or a plurality of ESCH) assigned by the base station device 2010 referring to the assignment status of subchannels stored in a channel information storage unit 2050, to create a symbol sequence. The modulation/demodulation unit 2026 outputs the received data frame acquired by decoding the symbol sequence to the data buffer 2028.

The modulation/demodulation unit 2026 also includes a symbol mapping unit, an IFFT unit, and a D/A converter. The modulation/demodulation unit 2026 OFDM-modulates a transmission data frame which is input from the data buffer 2028 (transmission queue 2030) and outputs the acquired baseband OFDM signal to the signal processor 2024. More specifically, the modulation/demodulation unit 2026 divides the transmission data frame referring to the assignment status of subchannels stored in the channel information storage unit 2050, and creates transmission data corresponding to each of the plurality of subchannels (one ASCH and one or a plurality of ESCH) assigned by the base station device 2010. Then, the modulation/demodulation unit 2026 converts the created transmission data of each of the subchannels into a symbol sequence through a symbol mapping, and distributes the symbol sequence over the subcarriers of the subchannel. The modulation/demodulation unit 2026 applies an IFFT in the IFFT unit, and outputs the baseband OFDM signal acquired through a D/A conversion to the signal processor 2024.

The data buffer 2028 includes the transmission queue 2030. The data buffer 2028 temporarily stores the received data frames from the base station device 2010 which are input from the modulation/demodulation unit 2026 and sequentially outputs the received data acquired by connecting the received data frames to an upper device (not shown) through the predetermined external I/F unit 2032. In addition, the data buffer 2028 temporarily stores transmission data frames to each of the mobile station devices 2012 which are input from the upper device through the external I/F unit 2032 and the data which is input from the data input unit 2034 such as a numerical pad, creates a transmission data frame based on these transmission data, and sequentially outputs to the modulation/demodulation unit 2026 through the transmission queue 2030.

The transmission queue 2030 holds the transmission data frame in a list structure of a First In First Out (FIFO) method. The transmission data frame or the retransmission data frame which is input from the data frame retransmission controller 2036 is added to the transmission queue 2030 in each TDMA frame. The first data frame in the transmission queue 2030 is extracted in each TDMA frame and output to the modulation/demodulation unit 2026.

The storage unit 2046 includes a memory, and also includes a processing capability storage unit 2048, the channel information storage unit 2050, and a timing difference information storage unit 2052.

The processing capability storage unit 2048 stores information indicating the processing capability of the mobile station device 2012 (for example, level 1). In general, a device with a higher processing capability can complete each process in shorter time.

The channel information storage unit 2050 stores the subchannels (one ASCH and one or a plurality of ESCH) assigned by the base station device 2010. Because the ASCH is a subchannel for transmitting the ACK information, the slot position of the ASCH indicates the reception timing (reception slot) of the ACK information.

The timing difference information storage unit 2052 stores, in correlation to information indicating the processing capability of the mobile station device 2012 and information indicating a reception timing of a NACK, timing difference information indicating a timing difference which satisfies a condition related to a reference required time. Here, the reference required time is the minimum time required for the process from the reception of the NACK to the retransmission of the data frame (hereinafter referred to as data frame retransmission process) and varies according to the process executing speed of the mobile station device 2012. In other words, the reference required time is shorter for a mobile station device 2012 having a higher processing capability and is longer for a mobile station device 2012 having a lower processing capability. The timing difference which satisfies a condition related to the reference required time is a timing difference between the reception timing of the NACK and the retransmission timing of the data frame corresponding to the NACK, and is a timing difference which is greater than or equal to the reference required time and which is as close to the reference required time as possible. The reception timing of the NACK may be identified by the reception slot of the NACK, and the retransmission timing of the data frame may be identified by the transmission slot of the retransmission data frame or the transmission frame including the transmission slot.

FIG. 18 is a diagram showing an example of the timing difference information storage unit 2052. As shown in FIG. 18, the timing difference information storage unit 2052 stores timing difference information (timing 1, timing 2) in correlation to information indicating the processing capability of the mobile station device 2012 (level 0, level 1, . . . ) and the slot position of the ASCH (subchannel for transmitting the ACK information). This indicates a correspondence relationship between the slot position of the ASCH indicating the reception slot of the NACK and the transmission frame indicating the timing of the retransmission of the data frame corresponding to the NACK, and the transmission frame is set so that the reference required time required for the data frame retransmission process in the mobile station device 2012 is secured and minimized. Because the reference required time varies according to the processing capability indicating the process executing speed of the mobile station device 2012 as described above, FIG. 18 shows a plurality of the correspondence relationships (in this configuration, five correspondence relationships) for each processing capability of the mobile station device 2012. In other words, the information indicated in the timing difference information storage unit 2052 shown in FIG. 18 indicates, for each slot position of ASCH indicating the reception slot of the NACK, an optimum transmission frame which secures the reference required time corresponding to the processing capability of the mobile station device 2012 and minimizes the data frame retransmission process time. Because of this, for example, when the processing capability of the mobile station device 2012 is "level 1" and the NACK is received in the "third slot" (when the slot position of the ASCH is the "third slot"), the data frame retransmission process time is shortened by the maximum amount if the data frame is retransmitted in the next frame of the reception slot (timing 1).

The data frame retransmission controller 2036 includes a retransmission request acquiring unit 2038, a data frame retransmission timing determining unit 2040, a transmission-complete buffer 2042, and a retransmission data frame selecting unit 2044. The data frame retransmission controller 2036 controls, in response to a retransmission request transmitted from the base station device 2010, retransmission of the data frame corresponding to the retransmission request.

The retransmission request acquiring unit 2038 acquires the ACK information in each TDMA frame from the received data which is output from the data buffer 2028 and acquires the reception timing (reception slot) of the ACK information.

The data frame retransmission timing determining unit 2040 determines the retransmission timing (transmission slot or transmission frame) of the data frame corresponding to the NACK based on the processing capability of the mobile station device 2012 so that the timing difference between the reception timing of the NACK and the retransmission timing of the data frame corresponding to the NACK is close to the reference required time required for the data frame retransmission process.

FIG. 20 is a diagram for explaining a retransmission timing of the data frame identified by the data frame retransmission timing determining unit 2040. FIG. 20 shows a case where the slot position of the ASCH indicating the reception slot of the NACK is the first slot. As shown in FIG. 20(a), when the processing capability (process executing speed) of the mobile station device 2012 is high, the data frame retransmission timing determining unit 2040 determines the next transmission frame of the NACK reception slot as the data frame retransmission timing. This determination is based on design and experimental results that a mobile station device 2012 having a high processing capability can complete the retransmission process of the data frame within time period of approximately 3 slots from the NACK reception slot to the next transmission frame. In this case, the data frame retransmission process time can be shortened by at least 1 TDMA frame compared to the related art. When, on the other hand, the processing capability (process executing speed) of the mobile station device 2012 is low as shown in FIG. 20(b), the data frame retransmission timing determining unit 2040 determines a transmission frame following the next transmission frame of the NACK reception slot as the data frame retransmission timing. This determination is based on design and experimental results that, with the mobile station device 2012 having a low processing capability, although it is difficult to complete the data frame retransmission process in the time from the NACK reception slot to the next transmission frame (approximately 0 slot), the data frame retransmission process can be completed if there is time until the transmission frame following the next transmission frame. The data frame retransmission timing determining unit 2040 may determine the retransmission frame of the data frame further based on the reception timing (reception slot) of the NACK.

Alternatively, the data frame retransmission timing determining unit 2040 may read the timing difference information from the timing difference information storage unit 2052 in correlation to the processing capability of the mobile station device 2012 and the slot position of the ASCH indicating the reception slot of the NACK and determine the retransmission timing (transmission frame) of the data frame corresponding to the NACK based on the reception slot of the NACK and the read timing difference information.

The transmission-complete buffer 2042 temporarily stores at least some of the plurality of data frames transmitted to the base station device 2010, in correlation to the sequence number of each of the data frames. The first data frame in the transmission queue 2030 is transmitted in each TDMA frame, and, with the transmission, the data frame is extracted from the transmission queue 2030 and stored in the transmission-complete buffer 2042.

The retransmission data frame selecting unit 2044 selects, when the NACK is stored in the ACK information acquired by the retransmission request acquiring unit 2038, a data frame to be retransmitted from the transmission-complete buffer 2042 based on the sequence number of the data frame stored in the ACK information, and adds to the transmission queue 2030. When the ACK is stored in the ACK information, the retransmission data frame selecting unit 2044 deletes the data frame corresponding to the sequence number of the data frame stored in the ACK information from the transmission-complete buffer 2042.

An operation of the mobile station device 2012 will now be described.

Figure 21:
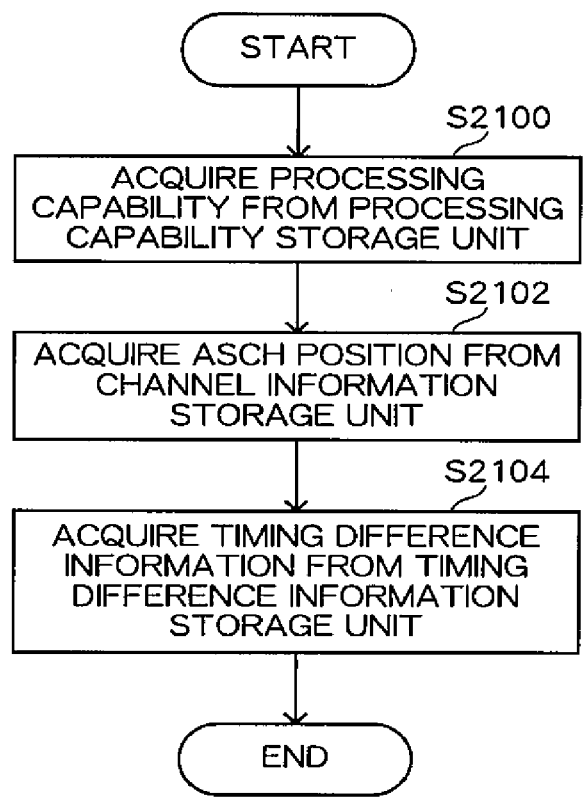
FIG. 21 is a flowchart showing a process for acquiring timing difference information in the mobile station device.

FIG. 21 is a flowchart showing a process for acquiring the timing difference information at the start of the communication. As shown in FIG. 21, when the communication is started, the channel information storage unit 2050 stores one ASCH and one or a plurality of ESCH assigned by the base station device 2010. Then, the data frame retransmission timing determining unit 2040 acquires the processing capability of the mobile station device 2012 from the processing capability storage unit 2048 (S2100). The data frame retransmission timing determining unit 2040 also acquires the slot position of the ASCH from the channel information storage unit 2050 (S2102). The data frame retransmission timing determining unit 2040 acquires the timing difference information from the timing difference information storage unit 2052 in correlation to the acquired processing capability of the mobile station device 2012 and the slot position of the ASCH (S2104).

Figure 22:
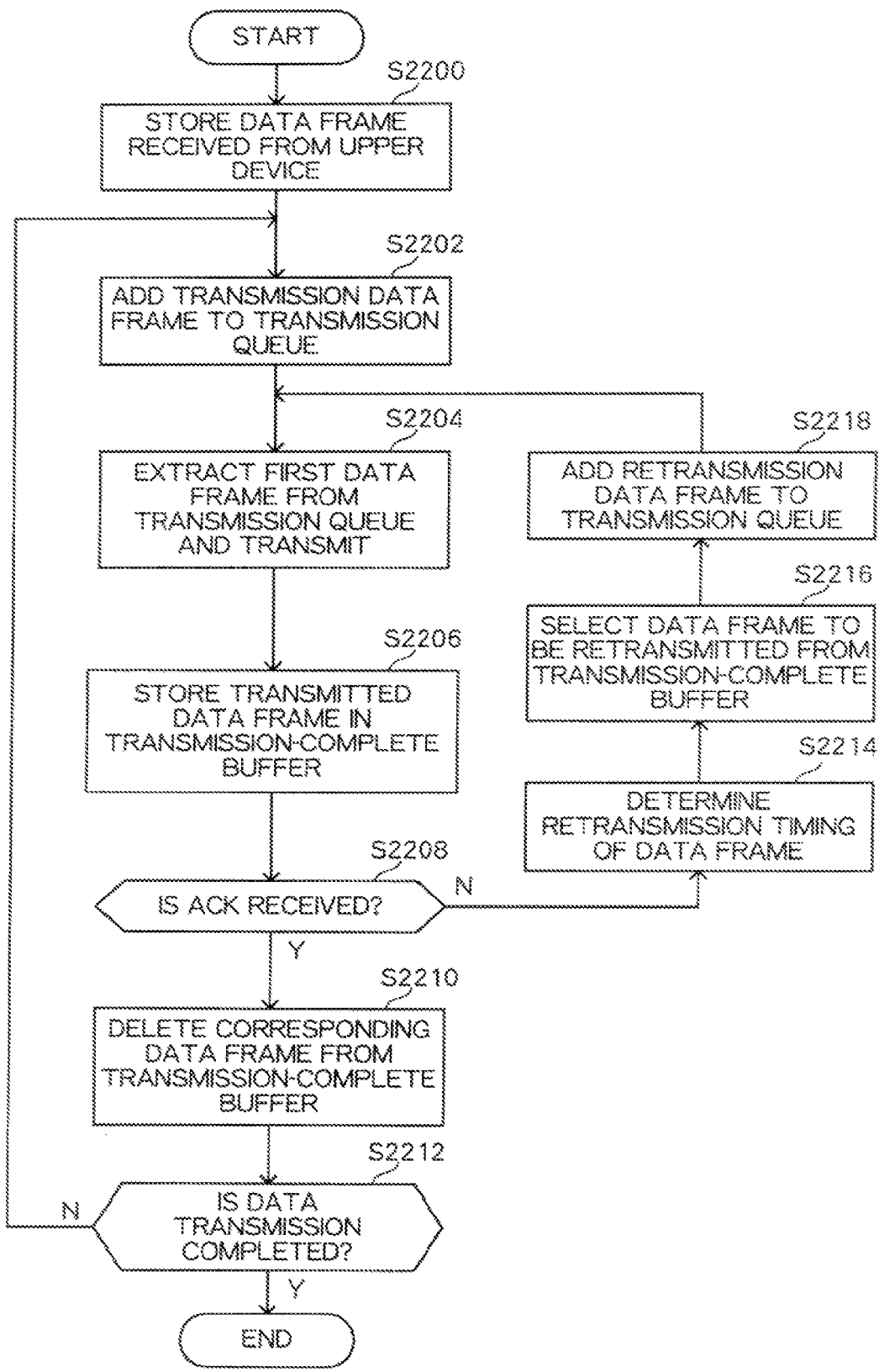
FIG. 22 is a flowchart showing a data frame transmission (and retransmission) process in the mobile station device.

FIG. 22 is a flowchart showing a data frame transmission (and retransmission) in the mobile station device 2012. As shown in FIG. 22, first, in an uplink frame, a data frame including a transmission packet received from an upper device is stored in the data buffer 2028 (S2200). Then, the data frame is added to the transmission queue 2030 (S2202). Next, the first data frame is extracted from the transmission queue 2030, converted to a transmission signal, and transmitted to the base station device 2010 (S2204). The transmitted data frame is stored in the transmission-complete buffer 2042 in correlation to its sequence number (S2206).

Next, in a downlink frame, the received data from the base station device 2010 is acquired. The retransmission request acquiring unit 2038 acquires the ACK information from the received data and determines whether the value stored in the ACK information is ACK or NACK (S2208). When the value is ACK, the retransmission data frame selecting unit 2044 deletes, based on the sequence number of the data frame stored in the ACK information, the corresponding data frame from the transmission-complete buffer 2042 (S2210). It is then determined whether or not the data transmission is completed (S2212), and, if the transmission is not completed, the processes from S2202 are executed in the next uplink frame.

When, on the other hand, the value stored in the ACK information is NACK in S2208, the data frame retransmission timing determining unit 2040 determines the transmission frame of the data frame corresponding to the NACK based on the reception slot of the NACK acquired by the retransmission request acquiring unit 2038 and the timing difference information acquired in S2104 (S2214). Then, the retransmission data frame selecting unit 2044 selects a data frame to be retransmitted from the transmission-complete buffer 2042 based on the sequence number of the data frame stored in the ACK information (S2216), and adds to the transmission queue 2030 so that the data frame is transmitted in the transmission frame determined in S2214 (S2218). At the next uplink frame, the processes from S2204 are executed.

According to the above-described embodiment, the retransmission timing (transmission frame) of the data frame corresponding to the NACK is determined in consideration of the processing capability of the mobile station device 2012 so that the time from the reception of the NACK to the retransmission of the data frame corresponding to the NACK is close to the reference required time required for the retransmission process of the data frame. Because of this configuration, it is possible to preferably shorten the time from the reception of the NACK to the retransmission of the data frame.

The present invention is not limited to the above-described embodiment, and various modified embodiments may be employed. For example, in the above description, the present invention is applied to the mobile station device in a mobile communication system which uses SDMA, TDMA/TDD, and OFDMA in combination, but the present invention can be applied to a general communication device which employs a TDMA/TDD and an automatic repeat request method of data frame.

What is claimed is:

1. A mobile station device configured to communicate with a base station device by a time division duplex (TDD) scheme, and to transmit retransmission data to the base station device by an automatic retransmission scheme in response to reception acknowledgement information transmitted from the base station device, comprising:
   a storage unit configured to store a table in which a number of frames from a reception of the reception acknowledgement information to a transmission of the retransmission data is associated with each of a plurality of reception time units;
   a receiver configured to receive the reception acknowledgement information from the base station device; and
   a controller configured to change a number of frames from a reception of the reception acknowledgement information to a transmission of the retransmission data, based on a position of a reception time unit within a reception frame, the reception time unit including the reception acknowledgement information, wherein the controller is further configured to change the number of frames based on the table stored in the storage unit.

2. A communication control method used in a mobile station device configured to communicate with a base station device by a time division duplex (TDD) scheme, and to transmit retransmission data to the base station device by an automatic retransmission scheme in response to reception acknowledgement information transmitted from the base station device, comprising:
   storing a table in which a number of frames from a reception of the reception acknowledgement information to a transmission of the retransmission data is associated with each of a plurality of reception time units;
receiving the reception acknowledgement information from the base station device; and
changing a number of frames from a reception of the reception acknowledgement information to a transmission of the retransmission data, based on a position of a reception time unit within a reception frame, the reception time unit including the reception acknowledgement information, wherein changing the number of frames is based on the table.

* * * * *